United States Patent
Sakamoto et al.

(10) Patent No.: US 11,870,927 B2
(45) Date of Patent: Jan. 9, 2024

(54) IN-VEHICLE HANDS-FREE APPARATUS, IN-VEHICLE HANDS-FREE SYSTEM, AND DATA TRANSFER METHOD

(71) Applicant: Panasonic Intellectual Property Management Co., Ltd., Osaka (JP)

(72) Inventors: Akito Sakamoto, Kanagawa Ken (JP); Tomoaki Katada, Kanagawa Ken (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 44 days.

(21) Appl. No.: 17/840,187

(22) Filed: Jun. 14, 2022

(65) Prior Publication Data

US 2022/0407953 A1 Dec. 22, 2022

(30) Foreign Application Priority Data

Jun. 16, 2021 (JP) ................................. 2021-100499

(51) Int. Cl.
*H04M 1/00* (2006.01)
*H04M 1/60* (2006.01)

(52) U.S. Cl.
CPC ................................. *H04M 1/6075* (2013.01)

(58) Field of Classification Search
CPC ........... H04M 1/6091; H04M 2250/02; H04M 1/2757; H04M 1/6075; H04M 2203/551; H04M 1/575; H04M 1/72412; H04M 1/724098; H04M 1/6041
See application file for complete search history.

(56) References Cited

U.S. PATENT DOCUMENTS

| | | | |
|---|---|---|---|
| 8,369,903 B2 * | 2/2013 | Saitoh | H04M 1/2757 455/66.1 |
| 8,798,686 B2 * | 8/2014 | Abeta | H04M 1/72436 455/418 |
| 9,426,656 B2 | 8/2016 | Takemura et al. | |
| 10,243,605 B2 * | 3/2019 | Sakata | H04M 1/6091 |
| 10,742,247 B2 * | 8/2020 | Sakata | H04W 4/40 |
| 11,522,990 B2 * | 12/2022 | Ozaki | H04M 1/56 |

FOREIGN PATENT DOCUMENTS

| | | |
|---|---|---|
| JP | 2002-193046 | 7/2002 |
| JP | 2006-109292 | 4/2006 |
| JP | 2014-116958 | 6/2014 |
| WO | 2014/050459 | 4/2014 |

* cited by examiner

*Primary Examiner* — Nhan T Le
(74) *Attorney, Agent, or Firm* — Greenblum & Bernstein, P.L.C.

(57) ABSTRACT

An in-vehicle hands-free apparatus is configured to: perform control relating to data transfer using a transfer protocol to achieve transfer of first incoming call history data representing a source of an incoming call received by first communication of voice using a phone application dedicated to an operating system of a mobile phone, first outgoing call history data, phone book data, second incoming call history data representing a source of an incoming call received by second communication of voice using a communication application, second outgoing call history data, and registration data, stored in the mobile phone, when the mobile phone exists in a wireless connection area; and store the received first incoming call history data, first outgoing call history data, phone book data, second incoming call history data, second outgoing call history data, and registration data.

7 Claims, 33 Drawing Sheets

FIG.2
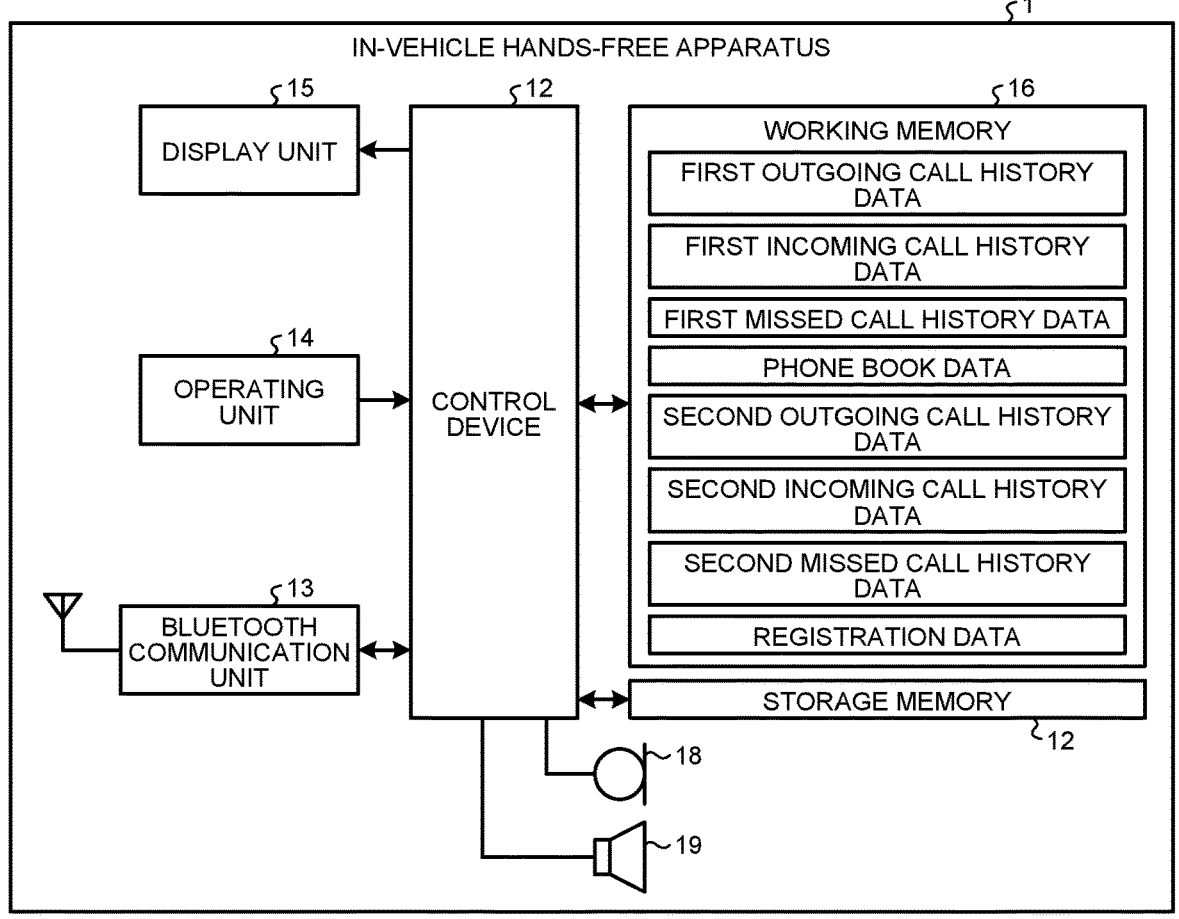
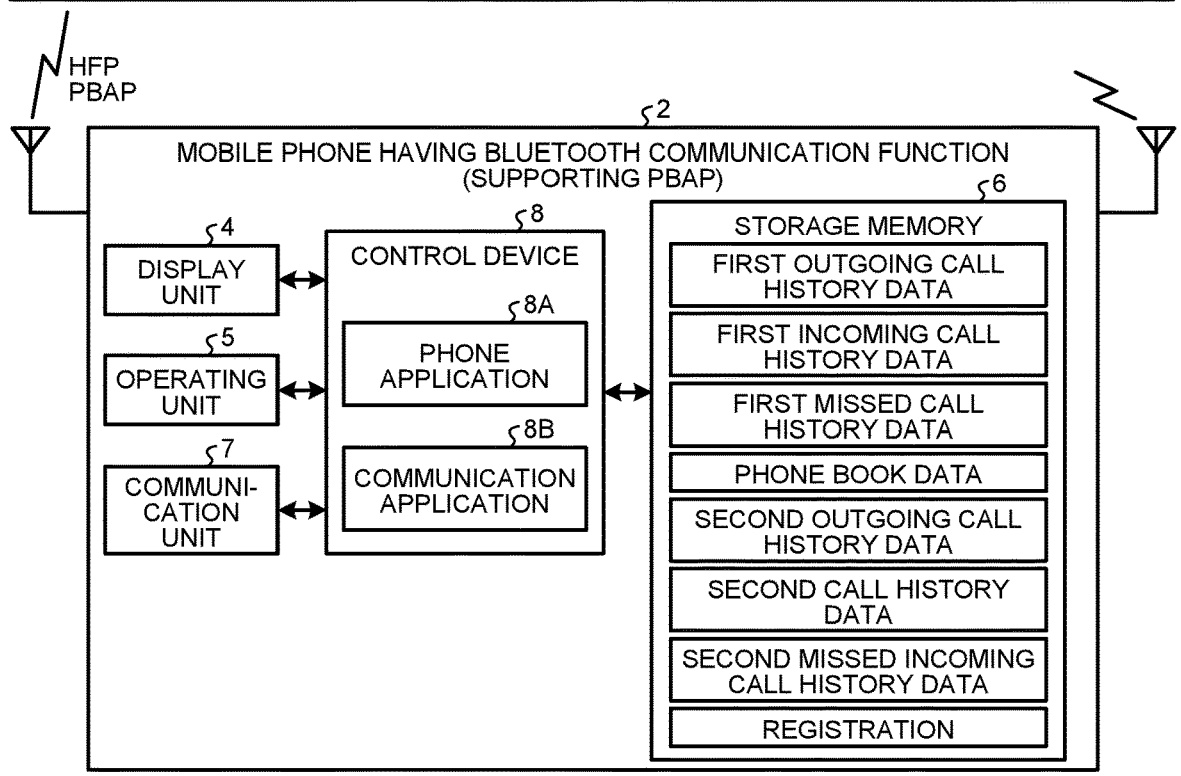

FIG.6A

| FIRST OUTGOING CALL HISTORY DATA | | |
|---|---|---|
| TARO ABE | 090××××××× | AUGUST 10 12:15 |
| HANAKO SATO | 090××××××× | AUGUST 10 12:00 |
| TARO ABE | 090××××××× | AUGUST 10 11:20 |
| KAZUO TANAKA | 090××××××× | AUGUST 10 11:10 |
| KAZUO TANAKA | 090××××××× | AUGUST 10 10:50 |
| JIRO NOMURA | 090××××××× | AUGUST 10 10:15 |

FIG.6B

| PHONE BOOK DATA | |
|---|---|
| ICHIRO KATO | 090××××××× |
| GORO OKADA | 090××××××× |
| SHIRO MORI | 090××××××× |
| JIRO YAMADA | 090××××××× |
| ICHIRO YOSHIMOTO | 090××××××× |
| SABURO WATANABE | 090××××××× |
| ... | 090××××××× |

FIG.6C

| FIRST OUTGOING CALL HISTORY DATA | | |
|---|---|---|
| ICHIRO KATO | 090××××××× | AUGUST 10 13:40 |
| TARO ABE | 090××××××× | AUGUST 10 12:15 |
| HANAKO SATO | 090××××××× | AUGUST 10 12:00 |
| TARO ABE | 090××××××× | AUGUST 10 11:20 |
| KAZUO TANAKA | 090××××××× | AUGUST 10 11:10 |
| KAZUO TANAKA | 090××××××× | AUGUST 10 10:50 |

← DISPLAY REGISTERED NAME OF PHONE BOOK DATA

FIG.7A

| FIRST INCOMING CALL HISTORY DATA | | |
|---|---|---|
| ICHIRO KATO | 090×××××××× | AUGUST 10 13:00 |
| AIKO HAYASHI | 090×××××××× | AUGUST 10 12:25 |
| ROKURO MORI | 090×××××××× | AUGUST 10 11:45 |
| ICHIRO KATO | 090×××××××× | AUGUST 10 11:15 |
| SHICHIRO YAMADA | 090×××××××× | AUGUST 10 11:10 |
| HACHIRO UEDA | 090×××××××× | AUGUST 10 10:20 |

FIG.7B

| PHONE BOOK DATA | |
|---|---|
| ICHIRO KATO | 090×××××××× |
| GORO OKADA | 090×××××××× |
| SHIRO MORI | 090×××××××× |
| JIRO YAMADA | 090×××××××× |
| ICHIRO YOSHIMOTO | 090×××××××× |
| SABURO WATANABE | 090×××××××× |
| … | 090×××××××× |

FIG.7C

| FIRST INCOMING CALL HISTORY DATA | | |
|---|---|---|
| ICHIRO YOSHIMOTO | 090×××××××× | AUGUST 10 13:25 |
| ICHIRO KATO | 090×××××××× | AUGUST 10 13:00 |
| AIKO HAYASHI | 090×××××××× | AUGUST 10 12:25 |
| ICHIRO KATO | 090×××××××× | AUGUST 10 11:45 |
| ROKURO MORI | 090×××××××× | AUGUST 10 11:15 |
| SHICHIRO YAMADA | 090×××××××× | AUGUST 10 11:10 |

← DISPLAY REGISTERED NAME OF PHONE BOOK DATA

FIG.8A

| FIRST MISSED CALL HISTORY DATA | | |
|---|---|---|
| TARO MURAKAMI | 090×××××××× | AUGUST 10 12:28 |
| HANAKO SAITO | 090×××××××× | AUGUST 10 12:24 |
| HANAKO UEDA | 090×××××××× | AUGUST 10 12:06 |
| JIRO OBAYASHI | 090×××××××× | AUGUST 10 11:04 |
| HANAKO SAITO | 090×××××××× | AUGUST 10 10:54 |
| KAZUO OMURA | 090×××××××× | AUGUST 10 10:24 |

FIG.8B

| PHONE BOOK DATA | |
|---|---|
| ICHIRO KATO | 090×××××××× |
| GORO OKADA | 090×××××××× |
| SHIRO MORI | 090×××××××× |
| JIRO YAMADA | 090×××××××× |
| ICHIRO YOSHIMOTO | 090×××××××× |
| SABURO WATANABE | 090×××××××× |
| ... | 090×××××××× |

FIG.8C

| FIRST MISSED INCOMING CALL HISTORY DATA | | |
|---|---|---|
| SABURO WATANABE | 090×××××××× | AUGUST 10 12:46 |
| TARO MURAKAMI | 090×××××××× | AUGUST 10 12:28 |
| HANAKO SAITO | 090×××××××× | AUGUST 10 12:24 |
| HANAKO UEDA | 090×××××××× | AUGUST 10 12:06 |
| JIRO OBAYASHI | 090×××××××× | AUGUST 10 11:04 |
| HANAKO SAITO | 090×××××××× | AUGUST 10 10:54 |

← DISPLAY REGISTERED NAME OF PHONE BOOK DATA

FIG.9

| FIRST OUTGOING CALL HISTORY DATA | | |
|---|---|---|
| TARO ABE | 090xxxxxxxx | AUGUST 10 12:15 |
| HANAKO SATO | 090xxxxxxxx | AUGUST 10 12:00 |
| TARO ABE | 090xxxxxxxx | AUGUST 10 11:20 |
| KAZUO TANAKA | 090xxxxxxxx | AUGUST 10 11:10 |
| KAZUO TANAKA | 090xxxxxxxx | AUGUST 10 10:50 |
| JIRO NOMURA | 090xxxxxxxx | AUGUST 10 10:15 |

| FIRST INCOMING CALL HISTORY DATA | | |
|---|---|---|
| ICHIRO KATO | 090xxxxxxxx | AUGUST 10 13:00 |
| AIKO HAYASHI | 090xxxxxxxx | AUGUST 10 12:25 |
| ROKURO MORI | 090xxxxxxxx | AUGUST 10 11:45 |
| ICHIRO KATO | 090xxxxxxxx | AUGUST 10 11:15 |
| SHICHIRO YAMADA | 090xxxxxxxx | AUGUST 10 11:10 |
| HACHIRO UEDA | 090xxxxxxxx | AUGUST 10 10:20 |

| FIRST MISSED CALL HISTORY DATA | | |
|---|---|---|
| TARO MURAKAMI | 090xxxxxxxx | AUGUST 10 12:28 |
| HANAKO SAITO | 090xxxxxxxx | AUGUST 10 12:24 |
| HANAKO UEDA | 090xxxxxxxx | AUGUST 10 12:06 |
| JIRO OBAYASHI | 090xxxxxxxx | AUGUST 10 11:04 |
| HANAKO SAITO | 090xxxxxxxx | AUGUST 10 10:54 |
| KAZUO OMURA | 090xxxxxxxx | AUGUST 10 10:24 |

| FIRST ALL HISTORY DATA | | |
|---|---|---|
| ICHIRO KATO | 090xxxxxxxx | AUGUST 10 13:00 |
| TARO MURAKAMI | 090xxxxxxxx | AUGUST 10 12:28 |
| AIKO HAYASHI | 090xxxxxxxx | AUGUST 10 12:25 |
| HANAKO SAITO | 090xxxxxxxx | AUGUST 10 12:24 |
| TARO ABE | 090xxxxxxxx | AUGUST 10 12:15 |
| HANAKO UEDA | 090xxxxxxxx | AUGUST 10 12:06 |
| HANAKO SATO | 090xxxxxxxx | AUGUST 10 12:00 |
| ROKURO MORI | 090xxxxxxxx | AUGUST 10 11:45 |
| ICHIRO KATO | 090xxxxxxxx | AUGUST 10 11:15 |
| SHICHIRO YAMADA | 090xxxxxxxx | AUGUST 10 11:10 |

DO NOT DISPLAY OUTGOING CALL HISTORY DATA WITH DUPLICATED PHONE NUMBER

FIG.10A

| SECOND OUTGOING CALL HISTORY DATA | | |
|---|---|---|
| ITO ... | XXXXXX | AUGUST 10 15:00 |
| SUZUKI ... | YYYYYY | AUGUST 10 16:00 |
| TAKAHASHI ... | ZZZZZZ | AUGUST 10 18:00 |

FIG.10B

| REGISTRATION DATA | | |
|---|---|---|
| ICON A | ITO ... | XXXXXX |
| ICON B | SUZUKI ... | YYYYYY |
| ICON C | TAKAHASHI ... | ZZZZZZ |
| ICON D | TANAKA ... | PPPPPP |
| ICON E | ITO ... | QQQQQQ |
| ... | ... | ... |

FIG.10C

| SECOND OUTGOING CALL HISTORY DATA | | | |
|---|---|---|---|
| ICON A | ITO ... | XXXXXX | AUGUST 10 15:00 |
| ICON B | SUZUKI ... | YYYYYY | AUGUST 10 16:00 |
| ICON C | TAKAHASHI ... | ZZZZZZ | AUGUST 10 18:00 |

FIG.11A

| SECOND INCOMING CALL HISTORY DATA | | |
|---|---|---|
| TANAKA ... | PPPPPP | AUGUST 10 17:00 |
| ITO ... | QQQQQQ | AUGUST 10 19:00 |

FIG.11B

| REGISTRATION DATA | | |
|---|---|---|
| ICON A | ITO ... | XXXXXXX |
| ICON B | SUZUKI ... | YYYYYYY |
| ICON C | TAKAHASHI ... | ZZZZZZZ |
| ICON D | TANAKA ... | PPPPPP |
| ICON E | ITO ... | QQQQQQ |
| ... | ... | ... |

FIG.11C

| SECOND INCOMING CALL HISTORY DATA | | | |
|---|---|---|---|
| ICON D | TANAKA ... | PPPPPP | AUGUST 10 17:00 |
| ICON E | ITO ... | QQQQQQ | AUGUST 10 19:00 |

FIG.12A

| SECOND MISSED CALL HISTORY DATA | | |
|---|---|---|
| ITO ... | XXXXXXX | AUGUST 10 14:30 |

FIG.12B

| REGISTRATION DATA | | |
|---|---|---|
| ICON A | ITO ... | XXXXXXX |
| ICON B | SUZUKI ... | YYYYYYY |
| ICON C | TAKAHASHI ... | ZZZZZZZ |
| ICON D | TANAKA ... | PPPPPP |
| ICON E | ITO ... | QQQQQQ |
| ... | ... | RRRRRRR |

FIG.12C

| SECOND MISSED CALL HISTORY DATA | | | |
|---|---|---|---|
| ICON A | ITO ... | XXXXXXX | AUGUST 10 14:30 |

FIG.13

| SECOND ALL HISTORY DATA | | | |
|---|---|---|---|
| ICON A | ITO ... | XXXXXXX | AUGUST 10 14:30 |
| ICON A | ITO ... | XXXXXXX | AUGUST 10 15:00 |
| ICON B | SUZUKI ... | YYYYYY | AUGUST 10 16:00 |
| ICON D | TANAKA ... | PPPPPP | AUGUST 10 17:00 |
| ICON C | TAKAHASHI ... | ZZZZZZZ | AUGUST 10 18:00 |
| ICON E | ITO ... | QQQQQQ | AUGUST 10 19:00 |

FIG.17A

| OUTGOING CALL PHONE NUMBER | OUTGOING CALL DATE AND TIME |
|---|---|
| 09000000005 | MAY 10 17:25 |
| 09000000004 | MAY 10 17:14 |
| 09000000003 | MAY 10 17:12 |
| 09000000002 | MAY 10 17:08 |
| 09000000001 | MAY 10 17:01 |

FIRST OUTGOING CALL HISTORY DATA AUTOMATICALLY TRANSFERRED FROM MOBILE PHONE

FIG.17B

| OUTGOING CALL PHONE NUMBER | OUTGOING CALL DATE AND TIME |
|---|---|
| 09000000100 | MAY 10 17:32 |
| 09000000005 | MAY 10 17:25 |
| 09000000004 | MAY 10 17:14 |
| 09000000003 | MAY 10 17:12 |
| 09000000002 | MAY 10 17:08 |

FIRST OUTGOING CALL HISTORY DATA OF HANDS-FREE APPARATUS

FIRST OUTGOING CALL HISTORY DATA AUTOMATICALLY TRANSFERRED FROM MOBILE PHONE

FIG.18A

| INCOMING CALL PHONE NUMBER | INCOMING CALL DATE AND TIME |
|---|---|
| 09000000010 | MAY 10 17:45 |
| 09000000009 | MAY 10 17:20 |
| 09000000008 | MAY 10 16:59 |
| 09000000007 | MAY 10 16:52 |
| 09000000006 | MAY 10 16:50 |

} FIRST INCOMING CALL HISTORY DATA AUTOMATICALLY TRANSFERRED FROM MOBILE PHONE

FIG.18B

| INCOMING CALL PHONE NUMBER | INCOMING CALL DATE AND TIME |
|---|---|
| 09000000200 | MAY 10 17:50 |
| 09000000010 | MAY 10 17:45 |
| 09000000009 | MAY 10 17:20 |
| 09000000008 | MAY 10 16:59 |
| 09000000007 | MAY 10 16:52 |

} FIRST INCOMING CALL HISTORY DATA OF HANDS-FREE APPARATUS

} FIRST INCOMING CALL HISTORY DATA AUTOMATICALLY TRANSFERRED FROM MOBILE PHONE

IN-VEHICLE HANDS-FREE APPARATUS, IN-VEHICLE HANDS-FREE SYSTEM, AND DATA TRANSFER METHOD

CROSS-REFERENCE TO RELATED APPLICATIONS

This application is based upon and claims the benefit of priority from Japanese Patent Application No. 2021-100499, filed on Jun. 16, 2021, the entire contents of which are incorporated herein by reference.

FIELD

The present disclosure relates to an in-vehicle hands-free apparatus, an in-vehicle hands-free system, and a data transfer method.

BACKGROUND

There are technologies of establishing a channel between a mobile phone and an in-vehicle hands-free apparatus when the mobile phone enters a short-range communication range of the in-vehicle hands-free apparatus and automatically transferring phone book data, incoming and outgoing call history data, and the like from the mobile phone to the in-vehicle hands-free apparatus. According to these technologies, a user can select a desired phone number from the phone book data of the mobile phone and make a call by operating the in-vehicle hands-free apparatus (for example, see Japanese Patent Application Laid-open No. 2014-116958 and Japanese Patent Application Laid-open No. 2002-193046). In addition, technologies related to a system in which an in-vehicle apparatus and a mobile apparatus are connected have been proposed (for example, see WO 2014/050459 and Japanese Patent Application Laid-open No. 2006-109292).

In recent years, as means of voice communication using mobile phones, voice communication over Internet lines or the like have been used in addition to voice communication over phone lines. For example, free call applications using social network services or the like are commonly used for voice communication over Internet lines or the like. Furthermore, a plurality of types of applications used for voice communication are installed on a mobile phone, which makes it possible to use voice communication using each of the plurality of applications. However, in the related art, cooperation between the mobile phone for voice communication using each of the plurality of applications and an in-vehicle hands-free apparatus has not been considered. That is, in the related art, it has been desired to further improve the convenience of the in-vehicle hands-free apparatus.

SUMMARY

An in-vehicle hands-free apparatus according to the present disclosure enables a hands-free call by being wirelessly connected to a mobile phone that stores first incoming call history data representing a source of an incoming call received by first communication of voice using a phone application dedicated to an operating system of the mobile phone, first outgoing call history data representing a destination of an outgoing call made by the first communication, and phone book data in which a call destination and a registered name are registered in association with each other, the call destination including the source of the incoming call received by the first communication and the destination of the outgoing call made by the first communication, second incoming call history data representing a source of an incoming call received by second communication of voice using a communication application, second outgoing call history data representing a destination of an outgoing call made by the second communication, and registration data in which a call destination and a registered name are registered in association with each other, the call destination including the source of the incoming call received by the second communication and the destination of the outgoing call made by the second communication. The in-vehicle hands-free apparatus includes a memory and a hardware processor coupled to the memory. The hardware processor is configured to: perform control relating to data transfer using a transfer protocol to achieve transfer of the first incoming call history data, the first outgoing call history data, the phone book data, the second incoming call history data, the second outgoing call history data, and the registration data, stored in the mobile phone, when the mobile phone exists in a wireless connection area; receive the first incoming call history data, the first outgoing call history data, the phone book data, the second incoming call history data, the second outgoing call history data, and the registration data from the mobile phone by communication using the transfer protocol; and store the received first incoming call history data, first outgoing call history data, phone book data, second incoming call history data, second outgoing call history data, and registration data.

BRIEF DESCRIPTION OF THE DRAWINGS

FIG. 2 is a diagram illustrating a hardware configuration of the in-vehicle hands-free system;

FIG. 6A is a diagram illustrating the correspondence between first outgoing call history data and phone book data;

FIG. 6B is a diagram illustrating the correspondence between first outgoing call history data and phone book data;

FIG. 6C is a diagram illustrating the correspondence between first outgoing call history data and phone book data;

FIG. 7A is a diagram illustrating the correspondence between first incoming call history data and phone book data;

FIG. 7B is a diagram illustrating the correspondence between first incoming call history data and phone book data;

FIG. 7C is a diagram illustrating the correspondence between first incoming call history data and phone book data;

FIG. 8A is a diagram illustrating the correspondence between first missed call history data and phone book data;

FIG. 8B is a diagram illustrating the correspondence between first missed call history data and phone book data;

FIG. 8C is a diagram illustrating the correspondence between first missed call history data and phone book data;

FIG. 9 is a diagram illustrating first outgoing call history data, first incoming call history data, first missed call history data, and first all history data;

FIG. 10A is a diagram illustrating the correspondence between second outgoing call history data and registration data;

FIG. 10B is a diagram illustrating the correspondence between second outgoing call history data and registration data;

FIG. 10C is a diagram illustrating the correspondence between second outgoing call history data and registration data;

FIG. 11A is a diagram illustrating the correspondence between second incoming call history data and registration data;

FIG. 11B is a diagram illustrating the correspondence between second incoming call history data and registration data;

FIG. 11C is a diagram illustrating the correspondence between second incoming call history data and registration data;

FIG. 12A is a diagram illustrating the correspondence between second missed call history data and registration data;

FIG. 12B is a diagram illustrating the correspondence between second missed call history data and registration data;

FIG. 12C is a diagram illustrating the correspondence between second missed call history data and registration data;

FIG. 13 is a diagram illustrating second all history data;

FIG. 17A is a diagram illustrating first outgoing call history data;

FIG. 17B is a diagram illustrating first outgoing call history data;

FIG. 18A is a diagram illustrating first incoming call history data;

FIG. 18B is a diagram illustrating first incoming call history data;

DETAILED DESCRIPTION

Hereinafter, embodiments of an in-vehicle hands-free apparatus, an in-vehicle hands-free system, and a data transfer method according to the present disclosure will be described with reference to the drawings.

Figure 1:
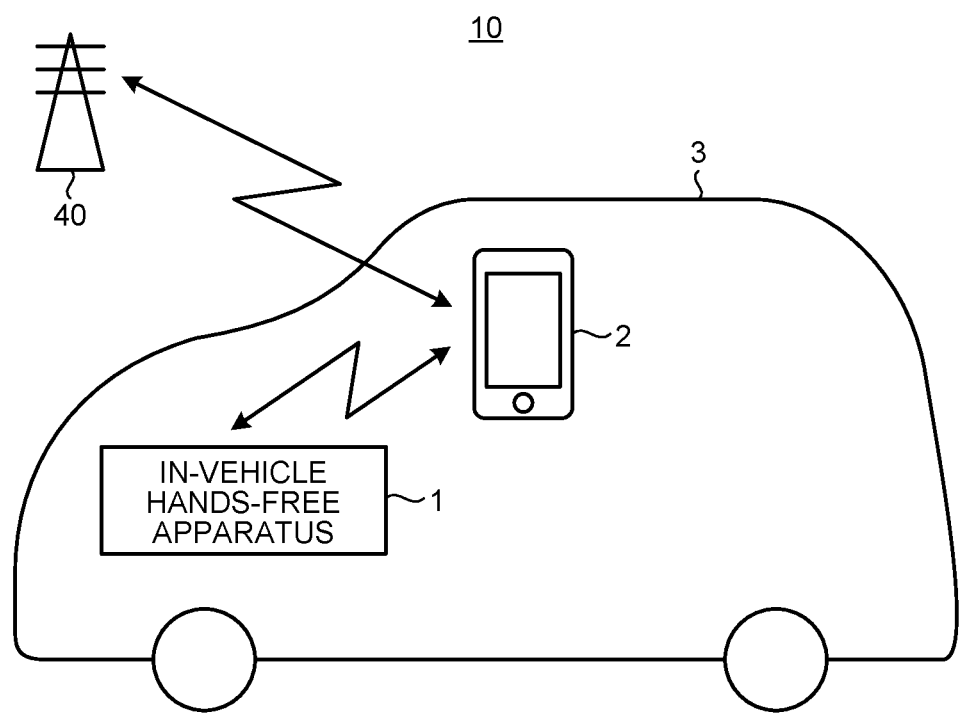
FIG. 1 is a schematic diagram of an in-vehicle hands-free system.

FIG. 1 is a schematic diagram illustrating an example of an in-vehicle hands-free system 10 according to the present embodiment. The in-vehicle hands-free system 10 includes an in-vehicle hands-free apparatus 1 and a mobile phone 2.

As illustrated in FIG. 1, the in-vehicle hands-free apparatus 1 of the present embodiment can be installed in a vehicle 3. The in-vehicle hands-free apparatus 1 is communicably connected to the mobile phone 2. By wirelessly communicating with a base station 40, the mobile phone 2 is connected to a channel such as a phone line and a network line via the base station 40. The network line may be referred to as an Internet line.

The mobile phone 2 is, for example, a smartphone, and has a communication function based on a Bluetooth (registered trademark) system. The mobile phone 2 may be a mobile phone of a type other than the smartphone as long as it has a communication function based on the Bluetooth system.

The in-vehicle hands-free apparatus 1 is connected to the channel such as a phone line and a network line via the mobile phone 2. With this, for example, a driver of the vehicle 3 can make an outgoing call and receive an incoming call, which are voice calls, by operating the in-vehicle hands-free apparatus 1 even without operating the mobile phone 2. The in-vehicle hands-free apparatus 1 may be implemented as one function of an in-vehicle hands-free apparatus installed in the vehicle 3, for example.

FIG. 2 is a diagram illustrating an example of a hardware configuration of the in-vehicle hands-free system 10 according to the present embodiment.

First, the mobile phone 2 will be described.

The mobile phone 2 includes a display unit (display) 4, an operating unit 5, a storage memory 6, a communication unit 7, and a control device 8. The display unit 4, the operating unit 5, the storage memory 6, the communication unit 7 are communicatively connected to the control device 8 via a bus or the like.

The display unit 4 is a display that displays various images such as a display screen. The operating unit 5 receives operation input from a user. A touch panel in which the display unit 4 and the operating unit 5 are integrally configured may be used.

The storage memory 6 stores therein various data. The storage memory 6 is configured as a nonvolatile memory and stores therein various data. The storage memory 6 is, for example, a read only memory (ROM). Furthermore, the storage memory 6 may be a writable storage medium such as a hard disk drive (HDD) or a flash memory.

The communication unit 7 supports the Bluetooth system. The communication unit 7 establishes a wireless channel with the in-vehicle hands-free apparatus 1 existing in a Bluetooth wireless communication range, and performs communication based on Bluetooth communication standards. The communication unit 7 of the present embodiment supports a hands-free profile (HFP) for making a hands-free voice call and a phone book access profile (PBAP) for transferring data. These protocols mean communication protocols defined for each function. Furthermore, the communication unit 7 connects to the phone line and the network line via the base station 40, and implements communication such as voice.

The mobile phone 2 is configured to be able to independently process outgoing and incoming phone calls over the phone line or the network line via the base station 40 without an HFP connected to the in-vehicle hands-free apparatus 1, that is, in a stand-alone state.

In the present embodiment, the mobile phone 2 is installed with a phone, that is, a plurality of applications used for voice calls.

Specifically, the mobile phone 2 of the present embodiment is installed with a phone application 8A and a communication application 8B.

The phone application 8A is an application program used for voice calls dedicated to an operating system (OS) of the mobile phone 2. The phone application 8A implements voice calls by first communication by connecting to at least one of the phone line and the network line via the base station 40.

The first communication means communication of voice using the phone application 8A. The first communication may be one method for voice communication. The communication of voice may be referred to and described as voice communication. The voice communication includes voice communication of analog voice or digital voice, and data communication of digital voice. For the data communication of digital voice, a voice over Internet protocol (VoIP) service, which enables voice calls by converting voice data into Internet protocol (IP) data packets for transmission, and the like are used.

In the present embodiment, a mode in which the first communication is voice communication over the phone line based on the phone application 8A will be described as an example.

The phone application 8A may be installed on the mobile phone 2 before or at the time of shipment of the mobile phone 2, or may be installed on the mobile phone 2 after the mobile phone 2 is shipped.

The communication application 8B is an application program used for voice calls installed on the mobile phone 2. The communication application 8B is an application program that is not dedicated to the OS of the mobile phone 2. The communication application 8B implements voice calls by second communication by connecting to at least one of the phone line and the network line via the base station 40.

The second communication means voice communication using the communication application 8B. The definition of the voice communication is the same as above. The second communication may be one method for communication of voice and may be a method different from the above first communication.

In the present embodiment, a mode in which the second communication is voice communication over the network line based on the communication application 8B will be described as an example. Voice communication and voice calls over the network line may be referred to as Internet telephony.

The communication application 8B is installed, for example, after the mobile phone 2 is shipped. The communication application 8B is, for example, an application such as a social network service. The communication application 8B includes, for example, an application called "LINE" operated and developed by LINE Corporation.

In the present embodiment, a mode in which the phone application 8A and the communication application 8B are installed on the mobile phone 2 as a plurality of applications used for voice calls will be described as an example. Three or more applications used for voice calls may be installed on the mobile phone 2.

The control device 8 of the mobile phone 2 can perform outgoing call processing and incoming call processing based on the first communication using the phone application 8A, and outgoing call processing and incoming call processing based on the second communication using the communication application 8B.

The outgoing call processing and the incoming call processing based on the first communication using the phone application 8A will be described.

For example, the user inputs a phone number of an outgoing call destination by operating a numeric keypad (number keys "0" to "9") on the operating unit 5 while the phone application 8A of the mobile phone 2 is started, and then operates an outgoing call key. The control device 8 of the mobile phone 2 performs outgoing call processing of making a call by the first communication by using the phone number as the outgoing call destination. This outgoing call processing enables the user to make a voice call based on the first communication with respect to the outgoing call destination.

Furthermore, when the mobile phone 2 receives an incoming call signal based on the first communication, the mobile phone 2 receives a phone number of an incoming call source based on the first communication from the base station 40 as an incoming call number. When the user operates an incoming call key via the phone application 8A, the control device 8 of the mobile phone 2 performs incoming call processing to answer the incoming call source. This incoming call processing enables the user to make a voice call based on the first communication with respect to the incoming call source.

Furthermore, the mobile phone 2 has a clock unit that counts date and time. The control device 8 of the mobile phone 2 stores and retains a plurality of pieces of first outgoing call history data in which correspondence between an outgoing call number input from the numeric keypad in the outgoing call processing based on the first communication and the outgoing call date and time based on the date and time counted by the clock unit is set as one piece of data. Furthermore, the control device 8 of the mobile phone 2 stores and retains, in the storage memory 6, a plurality of pieces of first incoming call history data in which correspondence between an incoming call number received from the base station 40 in the incoming call processing based on the first communication and the incoming call date and time based on the date and time counted by the clock unit is set as one piece of data.

Furthermore, the control device 8 of the mobile phone 2 stores and retains, in the storage memory 6, a plurality of pieces of first missed call history data in which correspondence between an incoming call number received from the base station 40 when making no response to an incoming call and the incoming call date and time based on the date and time counted by the clock unit is set as one piece of data.

Moreover, the control device 8 of the mobile phone 2 retains, in the storage memory 6, a plurality of pieces of phone book data in which correspondence between a phone number and a registered name is set as one piece of data. The phone book data is data in which a voice call destination based on the first communication and a registered name are associated with each other. In the present embodiment, a mode in which a phone number is registered in the phone book data as a voice call destination based on the first communication will be described as an example.

By reading the phone book data and selecting one phone number to make a call, the user can definitely make a call based on the first communication with a simple operation even without inputting all numeric keys corresponding to numbers constituting the phone number.

When an incoming call number received from the base station 40 is a phone number registered in the phone book data and a registered name for this phone number is registered in the phone book data, the control device 8 of the mobile phone 2 registers the incoming call number, the incoming call date and time, and the registered name as the first incoming call history data in association with one another. In the same way, the control device 8 of the mobile phone 2 registers a missed call number, an incoming call date and time, and a registered name as the first missed call history data in association with one another. In the same way, the control device 8 of the mobile phone 2 registers an outgoing call date and time, an outgoing call number, and the registered name as the first outgoing call history data in association with one another.

Next, outgoing call processing and incoming call processing based on the second communication using the communication application 8B will be described.

For example, the user reads registration data and selects one registered name while the communication application 8B of the mobile phone 2 is started. The mobile phone 2 performs outgoing call processing of making a call by the second communication by using a voice call destination of the selected registered name as an outgoing call destination. This outgoing call processing enables the user to make a voice call based on the second communication with respect to the outgoing call destination.

The registration data is data in which a registered name used in the communication application 8B, a voice call destination used in the communication application 8B for the registered name, and an icon are associated with one another. That is, the registration data is equivalent to phone book data.

The voice call destination used in the communication application 8B may be any information that can identify a user of the voice call destination by the second communication. In the present embodiment, a mode in which the voice call destination used in the communication application 8B is account information will be described as an example. That is, a mode in which the voice call destination registered in the registration data is the account information will be described as an example. The voice call destination used in the communication application 8B may be any information that can identify the user of the voice call destination by the second communication, and is not limited to the account information.

The icon is an image representing the user of the voice call destination identified by a corresponding registered name and voice call destination. The icon is registered in the registration data according to operations or the like by the user of the mobile phone 2, for example. The registration data may be in a form that includes no icon. The icon included in the registration data may be character information such as a nickname. Furthermore, the icon included in the registration data may be both the image representing the user and the character information such as a nickname.

Furthermore, when the mobile phone 2 receives an incoming call signal based on the second communication, the mobile phone 2 receives an incoming call source based on the second communication from the base station 40. When the user operates the incoming call key or the like via the communication application 8B, the control device 8 of the mobile phone 2 performs incoming call processing to answer the incoming call source. This incoming call processing enables the user to make a voice call based on the second communication with respect to the incoming call source.

Furthermore, the control device 8 of the mobile phone 2 stores and retains, in the storage memory 6, a plurality of pieces of second outgoing call history data in which correspondence between the registered name inputted in the outgoing call processing based on the second communication, the outgoing call date and time based on the date and time counted by the clock unit, and the outgoing call destination is set as one piece of data. Furthermore, the control device 8 of the mobile phone 2 stores and retains, in the storage memory 6, a plurality of pieces of second incoming call history data in which correspondence between the incoming call source received from the base station 40 in the incoming call processing based on the second communication and the incoming call date and time based on the date and time counted by the clock unit is set as one piece of data. In the present embodiment, a mode in which account information is stored in the second incoming call history data and the second outgoing call history data as the incoming call source and the outgoing call destination based on the second communication will be described as an example.

Furthermore, the control device 8 of the mobile phone 2 stores and retains, in the storage memory 6, a plurality of pieces of second missed call history data in which correspondence between an incoming call source received from the base station 40 when making no response to an incoming call and the incoming call date and time based on the date and time counted by the clock unit is set as one piece of data. In the present embodiment, a mode in which account information is stored in the second missed call history data as an incoming call source based on the second communication will be described as an example.

When the same voice call destination (account information or the like) as the incoming call source received from the base station 40 is registered in the registration data and a registered name corresponding to the incoming call source is registered in the registration data, the control device 8 of the mobile phone 2 registers the incoming call source, the incoming call date and time, and the registered name as the second incoming call history data in association with one another. In the same way, the control device 8 of the mobile phone 2 registers the incoming call source, the incoming call date and time, and the registered name as the second missed call history data in association with one another. In the same way, the control device 8 of the mobile phone 2 registers the outgoing call date and time, the outgoing call destination, and the registered name as the second outgoing call history data in association with one another.

Furthermore, when the mobile phone 2 does not answer an incoming call, the mobile phone 2 stores a voice message left by a caller in the storage memory 6. The voice message is also called, for example, a message memo, and can be played back so that the user of the mobile phone 2 listens the content.

The mobile phone 2 can store, for example, the latest 20 pieces of first outgoing call history data, the latest 20 pieces of first incoming call history data, and the latest 20 pieces of first missed call history data. The control device 8 of the mobile phone 2 automatically erases the oldest data for each outgoing call processing, each incoming call processing, or each missed call based on the first communication, and updates each of the first outgoing call history data, the first incoming call history data, and the first missed call history data.

Similarly, the mobile phone 2 can store, for example, the latest 20 pieces of second outgoing call history data, the latest 20 pieces of second incoming call history data, and the latest 20 pieces of second missed call history data. The control device 8 of the mobile phone 2 automatically erases the oldest data for each outgoing call processing, each incoming call processing, or each missed call based on the second communication, and updates each of the second outgoing call history data, the second incoming call history data, and the second missed call history data.

In the following description, when the first outgoing call history data, the first incoming call history data, and the first missed call history data are collectively described, they may be simply referred to as first history data. The first history data may include at least the first outgoing call history data and the first incoming call history data.

Furthermore, in the following description, when the second outgoing call history data, the second incoming call history data, and the second missed call history data are collectively described, they may be simply referred to as second history data. The second history data may include at least the second outgoing call history data and the second incoming call history data.

As described above, the mobile phone 2 of the present embodiment supports the HFP for making a hands-free voice call and the PBAP for transferring data. These protocols mean communication protocols defined for each function.

The control device 8 of the mobile phone 2 connects the PBAP immediately after establishing a channel with the in-vehicle hands-free apparatus 1, and automatically transfers first history data, phone book data, second history data, and registration data stored at that time to the in-vehicle hands-free apparatus 1. With this, when the in-vehicle hands-free apparatus 1 exists in the Bluetooth communication range, the mobile phone 2 can automatically transfer, to the in-vehicle hands-free apparatus 1, for example, maximum 20 pieces of first history data or maximum 20 pieces of second history data stored by independently performing outgoing call processing or incoming call processing in the past.

In addition to the functions illustrated in the drawing, the mobile phone 2 includes a microphone for voice input, a speaker for voice output, a camera, and the like.

Next, the in-vehicle hands-free apparatus 1 will be described.

The in-vehicle hands-free apparatus 1 is, for example, an in-vehicle hands-free apparatus having a hands-free function. The in-vehicle hands-free apparatus 1 includes a control device 12, a Bluetooth communication unit 13, an operating unit 14, a display unit 15, a working memory 16, a storage memory 17, a microphone 18, and a speaker 19.

The control device 12 controls an entire operation such as a communication operation and a data management operation of the in-vehicle hands-free apparatus 1. The control device 12 is, for example, a processor such as a CPU.

The Bluetooth communication unit 13 supports a Bluetooth system, establishes a channel with the mobile phone 2 existing in a Bluetooth wireless communication range, and performs communication based on Bluetooth communication standards. The present embodiment is based on the premise that the mobile phone 2 has a Bluetooth communication function and exists in the Bluetooth wireless communication range of the in-vehicle hands-free apparatus 1.

The Bluetooth communication unit 13 supports the HFP for making a hands-free call and the PBAP for transferring data.

The operating unit 14 receives operation input from a user. For example, the operating unit 14 includes touch keys or the like formed on the display unit 15. The display unit 15 is a display that displays various images such as a display screen. The operating unit 14 and the display unit 15 may be an integrally configured touch panel.

The working memory 16 is a memory for storing therein various data. The working memory 16 is configured as, for example, a volatile memory. The working memory 16 stores the first history data, the phone book data, the second history data, and the registration data automatically transferred from the mobile phone 2. The working memory 16 is, for example, a random access memory (RAM) or the like.

The storage memory 17 is configured as a nonvolatile memory and stores therein various data. The storage memory 17 is, for example, a read only memory (ROM). Furthermore, the storage memory 17 may be a writable storage medium such as a hard disk drive (HDD) or a flash memory.

The microphone 18 receives voice input. The microphone 18 receives voice uttered by the user when making a hands-free voice call using the mobile phone 2. The speaker 19 outputs voice. The speaker 19 outputs the received voice of a voice call destination when making a hands-free voice call using the mobile phone 2. It is assumed that a Bluetooth channel is established between the Bluetooth communication unit 13 and the mobile phone 2 to connect HFP-based wireless communication. In this case, the control device 12 causes the Bluetooth communication unit 13 to transmit voice input by the microphone 18 to the mobile phone 2. The mobile phone 2 transmits the received voice to the phone line or the network line by the first communication or the second communication. When the mobile phone 2 receives voice over the phone line or the network line, the control device 12 causes the speaker 19 to output the voice received by the mobile phone 2 via the Bluetooth communication unit 13.

In addition to the functional blocks illustrated in the drawing, the in-vehicle hands-free apparatus 1 described above may also include functional blocks required for a navigation operation, such as a global positioning system (GPS) device as a current position detector that detects a current position of a host vehicle, a route search unit that searches for a route from the current position to a destination, a map data reading unit that reads map data from a recording medium recording the map data, a vehicle information and communication system (VICS) (registered trademark) information reception unit that receives VICS information distributed from a VICS center, and a voice recognition unit that voice-recognizes voice uttered by the user. In this case, the in-vehicle hands-free apparatus 1 may extract GPS date and time information from GPS wireless signals received by the GPS device from GPS satellites to acquire a date and time, and use the acquired date and time as an outgoing call date and time or an incoming call date and time.

The in-vehicle hands-free apparatus 1 is configured to start and stop in conjunction with the on and off of an ACC (accessory) switch. The ACC switch is a switch that turns on and off the supply of power to vehicle devices. When the ACC switch is switched from on to off in response to a user's operation, for example, the supply of power to the in-vehicle hands-free apparatus 1 is stopped, so that the in-vehicle hands-free apparatus 1 is powered off. In this case, various data stored in the storage memory 17 are not erased but stored and retained, but the first history data, the second history data, the phone book data, and the registration data stored in the working memory 16 are erased.

Next, details of the functions of the in-vehicle hands-free apparatus 1 of the present embodiment will be described.

Figure 3:
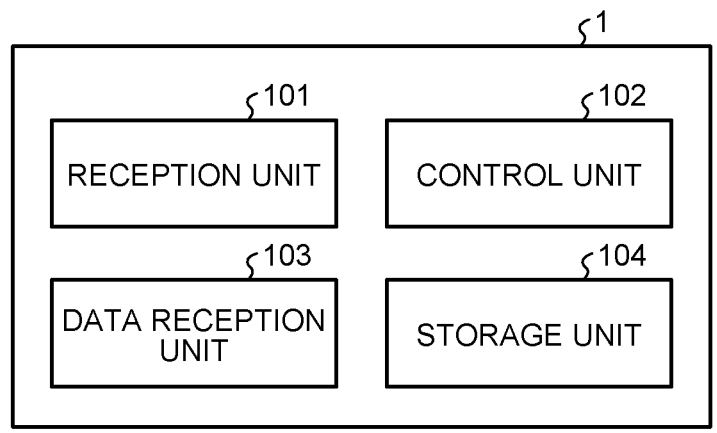
FIG. 3 is a diagram illustrating functions of an in-vehicle hands-free apparatus.

FIG. 3 is a diagram illustrating an example of the functions of the in-vehicle hands-free apparatus 1 according to the present embodiment. The functions of the in-vehicle hands-free apparatus 1 are not limited to the example in FIG. 3, and the in-vehicle hands-free apparatus 1 may have other functions. The in-vehicle hands-free apparatus 1 of the present embodiment includes a reception unit 101, a control unit 102, a data reception unit 103, and a storage unit 104.

Respective functions of the reception unit 101, the control unit 102, and the data reception unit 103 are implemented by the control device 12 that reads computer programs from the storage memory 17 and executes the computer programs. However, the present disclosure is not limited thereto and for example, some or all of the functions of the reception unit 101, the control unit 102, and the data reception unit 103 may be implemented by a dedicated hardware circuit. The storage unit 104 is implemented by, for example, the storage memory 17.

The reception unit 101 receives various operations from the user. For example, the reception unit 101 receives input according to user's operations via the operating unit 14. More specifically, the reception unit 101 receives instruction operations for various images displayed on the display unit 15.

The control unit 102 performs various types of control related to a hands-free function. In this example, the control unit 102 has such as a function for connecting to the mobile phone 2 so that a hands-free call can be made and a function for performing data transfer-related control when the mobile phone 2 exists in a wireless connection area. The data transfer-related control is control relating to data transfer using a transfer protocol for implementing transfer of the first history data, the second history data, the phone book data, and the registration data stored in the mobile phone 2.

Figure 4:
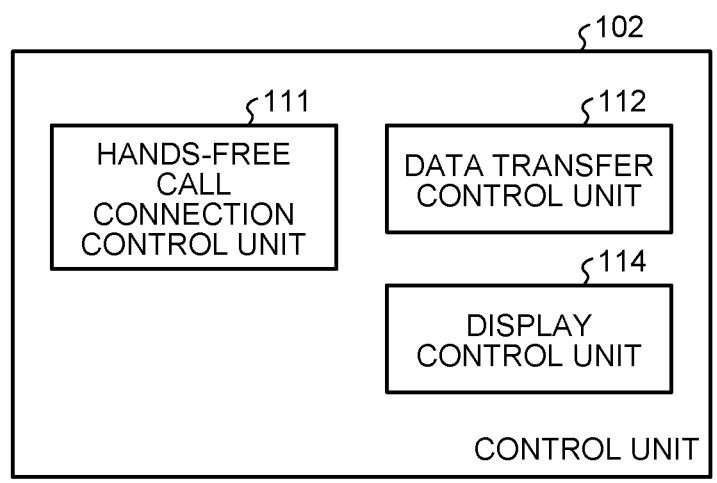
FIG. 4 is a diagram illustrating detailed functions of a control unit.

FIG. 4 illustrates an example of detailed functions of the control unit 102. The control unit 102 includes a hands-free call connection control unit 111, a data transfer control unit 112, and a display control unit 114. The functions of the control unit 102 are not limited thereto, and the control unit 102 may further have other functions for implementing the hands-free function.

The hands-free call connection control unit 111 is HFP-connected to the mobile phone 2 so that a hands-free voice call can be made. More specifically, the hands-free call connection control unit 111 is connected to the mobile phone 2 by controlling the Bluetooth communication unit 13 so that a hands-free voice call can be made. The hands-free call connection control unit 111 is connected to the mobile phone 2 by a hands-free voice call protocol for implementing a hands-free voice call by the mobile phone 2.

The data transfer control unit 112 controls data transfer using the above transfer protocol. The display control unit 114 causes the display unit 15 to display various screens. The specific contents thereof will be described below.

In the present embodiment, a mode in which various functions of the in-vehicle hands-free apparatus 1 are implemented by one device will be described as an example. However, various functions of the in-vehicle hands-free apparatus 1 may be distributed to a plurality of devices. That is, various functions of the in-vehicle hands-free apparatus 1 may be implemented by a system including a plurality of devices.

Next, the operation of the above configuration will be described.

The present embodiment will be described on the assumption that the mobile phone 2 has already retained a plurality of pieces of first history data and second history data and in this state and the mobile phone 2 has entered the Bluetooth communication range of the in-vehicle hands-free apparatus 1.

The present embodiment will be described on the assumption that the mobile phone 2 as a partner of Bluetooth communication is registered in advance in the in-vehicle hands-free apparatus 1.

For example, the user inputs a four-digit or other-digit password for each mobile phone 2 into the in-vehicle hands-free apparatus 1 during initial communication setup. The in-vehicle hands-free apparatus 1 and the mobile phone 2 generate a link key used to connect to each other, and retain the generated link key. Then, the in-vehicle hands-free apparatus 1 selects a mobile phone 2 to be communicably connected by authenticating the link key during the initial connection. That is, neither HFP-based communication connection nor PBAP-based communication connection is performed between the in-vehicle hands-free apparatus 1 and an unregistered mobile phone. Basically, the mobile phone 2 of an owner of the vehicle 3 is pre-registered, and Bluetooth communication is performed between the mobile phone 2 and the in-vehicle hands-free apparatus 1. The aforementioned method of pre-registering the mobile phone 2 to be communicated with the in-vehicle hands-free apparatus 1 is an example and the present disclosure is not limited thereto.

In the present embodiment, it is assumed that a plurality of mobile phones 2 to be communicably connected have been registered in the in-vehicle hands-free apparatus 1. Furthermore, for example, the user sets priorities for the mobile phones 2 in advance by operating the operating unit 14, and the working memory 16 or the storage memory 17 stores therein the priorities. For example, since a driver may own a plurality of mobile phones 2, it is assumed that the mobile phones 2 can be registered in the in-vehicle hands-free apparatus 1 in this way.

As a premise of the present embodiment, the Bluetooth communication part 13 of the in-vehicle hands-free apparatus 1 supports both protocols for HFP-based wireless communication and PBAP-based wireless communication and can simultaneously connect these two profiles. Connecting multiple profiles simultaneously may be referred to as a multi-profile connection.

However, in the in-vehicle hands-free apparatus 1 of the present embodiment, this simultaneous connection process is less likely to be performed. There are three main reasons for this.

(1) The mobile phone 2 as a communication partner supports the HFP-based wireless communication and the PBAP-based wireless communication, similarly to the in-vehicle hands-free apparatus 1, but may not support the simultaneous connection.

(2) The mobile phone 2 as a communication partner may support the HFP-based wireless communication and the PBAP-based wireless communication and may also support the simultaneous connection, but software processing of the Bluetooth communication unit 13 of the in-vehicle hands-free apparatus 1 may be complicated in order to maintain the simultaneous connection and communication connection may be unstable.

(3) Since the mobile phone 2 is manufactured by many manufacturers around the world, the in-vehicle hands-free apparatus 1 is required to connect to all mobile phones that support the HFP-based wireless communication and the PBAP-based wireless communication.

For the above reasons, the in-vehicle hands-free apparatus 1 in the present example makes a serial connection, in which the HFP-based wireless communication and the PBAP-based wireless communication are time-divided, as a more reliable processing procedure for the HFP-based wireless communication and the PBAP-based wireless communication in order to eliminate the simultaneous connection between the HFP-based wireless communication and the PBAP-based wireless communication as much as possible.

First, a procedure for the control device 12 in the in-vehicle hands-free apparatus 1 to receive the first history data, the phone book data, the second history data, and the registration data from the mobile phone 2 will be described.

Figure 5:
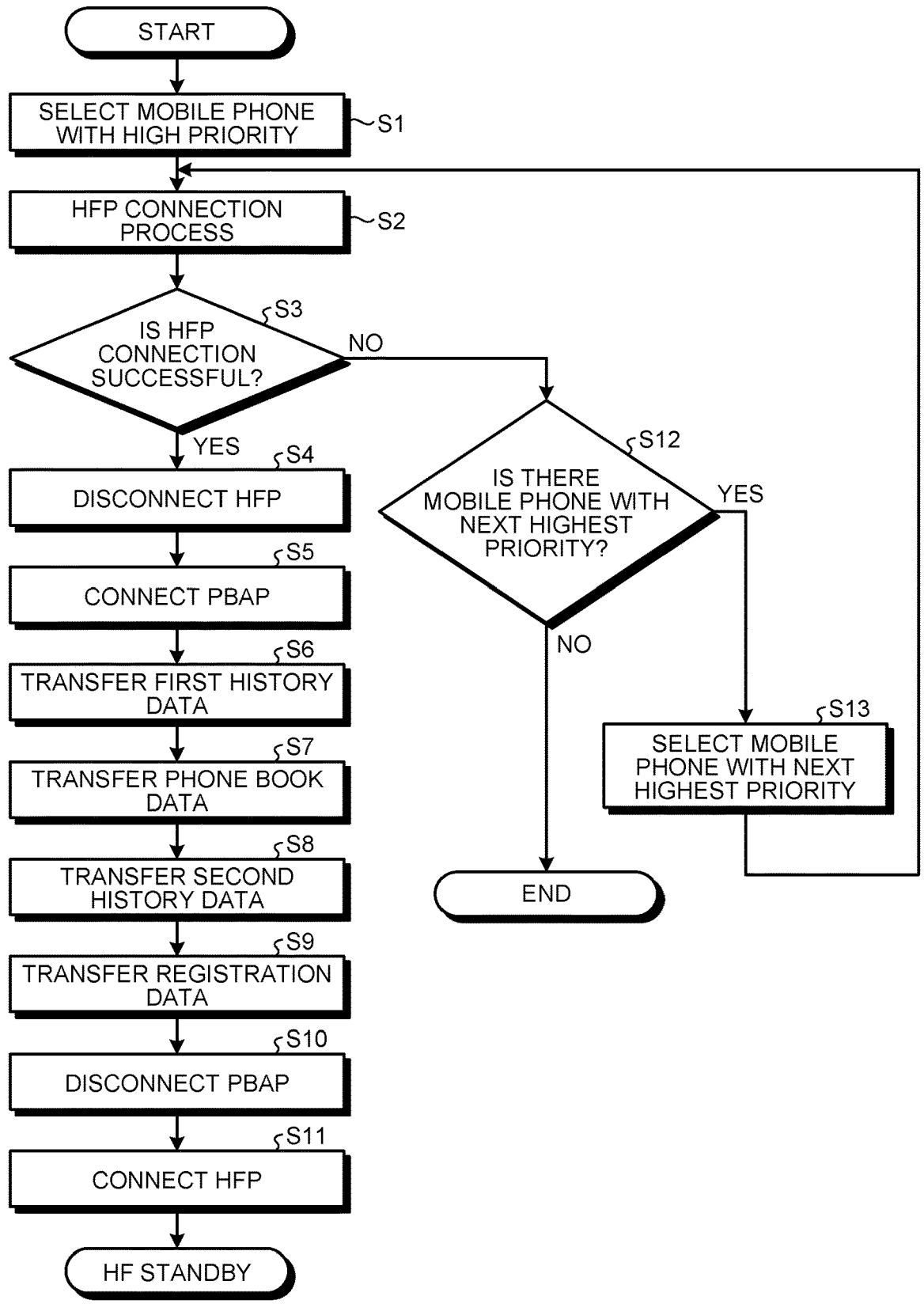
FIG. 5 is a flowchart illustrating a flow of a data transfer process in the in-vehicle hands-free apparatus.

FIG. 5 is a flowchart illustrating an example of a flow of a data transfer process in the in-vehicle hands-free apparatus 1.

The hands-free call connection control unit 111 selects a mobile phone 2 with a higher priority as a communication connection target in HFP-based wireless communication (S1). In the present embodiment, HFP-based initial communication is first automatically attempted to start connection without making PBAP-based communication connection.

Next, the hands-free call connection control unit 111 performs a process of automatically connecting the HFP-based initial communication to the mobile phone 2 selected at S1 (S2). Furthermore, the hands-free call connection control unit 111 determines whether the HFP-based wireless communication connection is successful (S3).

Furthermore, when it is determined that the HFP-based wireless communication connection is successful (Yes at S3), the hands-free call connection control unit 111 automatically interrupts the connected HFP-based wireless communication (S4).

Next, the data transfer protocol control unit 112 automatically connects PBAP-based communication to the mobile phone 2 that has succeeded in the HFP-based wireless communication connection (S5).

Next, the data transfer control unit 112 transmits a first history data transfer request to the mobile phone 2 so that a transfer process of the first history data is started (S6).

Upon receiving the first history data transfer request, the mobile phone 2 transfers the first history data to the in-vehicle hands-free apparatus 1 by the PBAP-based Bluetooth communication. The data reception unit 103 of the in-vehicle hands-free apparatus 1 receives the first history data. The storage unit 104 stores therein the first history data transferred from the mobile phone 2 in the working memory 16 or the storage memory 17.

When the transfer process of the first history data is completed, the data transfer control unit 112 transmits a phone book data transfer request to the mobile phone 2 so that a transfer process of the phone book data is started (S7).

Upon receiving the phone book data transfer request, the mobile phone 2 transfers the phone book data to the in-vehicle hands-free apparatus 1 by the PBAP-based Bluetooth communication. The data reception unit 103 receives the phone book data. The storage unit 104 of the control unit 102 stores therein the phone book data transferred from the mobile phone 2 in the working memory 16 or the storage memory 17.

Next, the data transfer control unit 112 transmits a second history data transfer request to the mobile phone 2 so that a transfer process of the second history data is started (S8).

Upon receiving the second history data transfer request, the mobile phone 2 transfers the second history data to the in-vehicle hands-free apparatus 1 by the PBAP-based Bluetooth communication. The data reception unit 103 receives the second history data. The storage unit 104 stores therein the second history data transferred from the mobile phone 2 in the working memory 16 or the storage memory 17.

When the transfer process of the second history data is completed, the data transfer control unit 112 transmits a registration data transfer request to the mobile phone 2 so that a transfer process of the registration data is started (S9).

Upon receiving the registration data transfer request, the mobile phone 2 transfers the registration data to the in-vehicle hands-free apparatus 1 by the PBAP-based Bluetooth communication. The data reception unit 103 receives the registration data. The storage unit 104 stores therein the registration data transferred from the mobile phone 2 in the working memory 16 or the storage memory 17.

When the transfer of the first history data, the phone book data, the second history data, and the registration data is completed, the control unit 102 (data transfer control unit 112) disconnects the PBAP-based wireless communication with the mobile phone 2 (S10).

Next, the data transfer control unit 112 automatically reconnects the HFP-based wireless communication to the mobile phone 2 (S11).

Then, when a channel based on the HFP with the mobile phone 2 is established, the hands-free call connection control unit 111 shifts to an in-vehicle hands-free (HF) standby process. During the execution of the in-vehicle hands-free standby process, the in-vehicle hands-free apparatus 1 is enabled to make an outgoing call or receive an incoming call via the mobile phone 2. The in-vehicle hands-free standby process continues until the in-vehicle hands-free apparatus 1 is powered off or the HFP-based wireless communication connection with the mobile phone 2 is terminated. Examples of the case where the HFP-based wireless communication connection with the mobile phone 2 is terminated include a case where the user performs a connection termination operation for the in-vehicle hands-free apparatus 1 or the mobile phone 2, a case where the mobile phone 2 leaves the Bluetooth communication range of the in-vehicle hands-free apparatus 1, or the like.

When it is determined that the HFP-based wireless communication connection is not successful, that is, has failed (No at S3), the hands-free call connection control unit 111 determines whether a mobile phone 2 with the next highest priority exists (S12).

When it is determined that the mobile phone 2 with the next highest priority exists (Yes at S12), the hands-free call connection control unit 111 selects the mobile phone 2 with the next highest priority as a wireless communication connection target (S13), returns to S2 described above, and repeats the process described above.

Furthermore, when it is determined that the mobile phone 2 with the next highest priority does not exist (No at S12), the hands-free call connection control unit 111 ends the process of the flowchart.

As described above, in the present embodiment, wireless communication is automatically switched serially in the order of HFP, PBAP, and HFP. This enables reliable and stable communication processing for mobile phones 2 of many manufacturers, which support the HFP-wireless communication and the PBAP-wireless communication. Furthermore, such a method makes it possible to reduce the complexity of software processing in the in-vehicle hands-free apparatus 1.

Furthermore, the in-vehicle hands-free apparatus 1 of the present embodiment transfers the first history data from the mobile phone 2 to the in-vehicle hands-free apparatus 1 before the phone book data, and transfers the second history data from the mobile phone 2 to the in-vehicle hands-free apparatus 1 before the registration data.

Therefore, the first history data or the second history data with a shorter transfer time can be preferentially transferred to the in-vehicle hands-free apparatus 1 before the phone book data or the registration data with a longer transfer time. This can reduce the time required to make a hands-free voice call when the mobile phone 2 is brought into the vehicle 3. Moreover, whether to receive the phone book data or the registration data, which is updated less frequently and requires a longer transfer time, can be selected as needed, which can improve convenience.

After the first history data and the second history data are transferred from the mobile phone 2 to the in-vehicle hands-free apparatus 1, the data transfer control unit 112 may cause the phone book data and the registration data to be transferred from the mobile phone 2 to the in-vehicle hands-free apparatus 1.

Next, the transfer process of the first history data and the phone book data described with reference to FIG. 5 and the like will be described in more detail.

FIG. 6A to FIG. 6C are diagrams illustrating an example of the correspondence between the first outgoing call history data and the phone book data. FIG. 6A is an example of the first outgoing call history data stored in the mobile phone 2. FIG. 6B is an example of the phone book data stored in the mobile phone 2. FIG. 6C is an example of the first outgoing call history data stored or displayed in the in-vehicle hands-free apparatus 1.

FIG. 7A to FIG. 7C are diagrams illustrating an example of the correspondence between the first incoming call history data and the phone book data. FIG. 7A is an example of the first incoming call history data stored in the mobile phone 2. FIG. 7B is an example of the phone book data stored in the mobile phone 2. FIG. 7C is an example of the first incoming call history data stored or displayed in the in-vehicle hands-free apparatus 1.

FIG. 8A to FIG. 8C are diagrams illustrating an example of the correspondence between the first missed call history data and the phone book data. FIG. 8A is an example of the first missed call history data stored in the mobile phone 2. FIG. 8B is an example of the phone book data stored in the mobile phone 2. FIG. 8C is an example of the first missed call history data stored or displayed in the in-vehicle hands-free apparatus 1.

The data reception unit 103 receives, from the mobile phone 2, the first outgoing call history data including registered names, outgoing call numbers, and outgoing call date and times illustrated in FIG. 6A. The storage unit 104 stores therein the first outgoing call history data in the working memory 16 or the storage memory 17.

Furthermore, the data reception unit 103 receives, from the mobile phone 2, the first incoming call history data including registered names, incoming call numbers, and incoming call date and times illustrated in FIG. 7A. The storage unit 104 stores therein the first incoming call history data in the working memory 16 or the storage memory 17.

Furthermore, the data reception unit 103 receives, from the mobile phone 2, the first missed call history data including registered names, missed call numbers, and incoming call date and times illustrated in FIG. 8A. The storage unit 104 stores therein the first missed call history data in the working memory 16 or the storage memory 17.

No registered names may be included in the first incoming call history data, the first outgoing call history data, and the first missed call history data received from the mobile phone 2. In this case, the storage unit 104 adds registered names to the first incoming call history data, the first outgoing call history data, and the first missed call history data by associating the phone numbers included in the first incoming call history data, the first outgoing call history data, and the first missed call history data with registered names associated with the phone numbers in the telephone book data. Then, the storage unit 104 may store therein these first history data in the working memory 16 or the storage memory 17.

Upon receiving a request to display the first outgoing call history data, the first incoming call history data, or the first missed call history data, the display control unit 114 displays these first history data stored in the working memory 16 or the storage memory 17 on the display unit 15. That is, the display control unit 114 can display registered names transferred from the mobile phone 2 on the display unit 15 without reading registered names from the phone book data stored in the working memory 16 or the storage memory 17.

The first history data may be stored in the working memory 16 or the storage memory 17 without including any registered names. In this case, the display control unit 114 displays the phone numbers included in the first history data and the registered names associated with the phone numbers in the phone book data, on the display unit 15 in association with each other.

When the hands-free call connection control unit 111 completes the HFP connection process described with reference to FIG. 5, the user can process outgoing and incoming phone calls based on each of the first communication and the second communication by operating the operating unit 14 on the in-vehicle hands-free apparatus 1 side.

Furthermore, after the data transfer control unit 112 receives the first history data from the mobile phone 2 by the initial connection process described with reference to FIG. 5, new outgoing call processing, incoming call processing, or missed call processing based on the first communication may be performed in the in-vehicle hands-free apparatus 1 or the mobile phone 2. Thereafter, it is assumed that the user operates the operating unit 14 to request the display of the first history data. In this case, when the phone book data includes registered names corresponding to outgoing call numbers, incoming call numbers, and missed call numbers for which the new outgoing call processing, incoming call processing, or missed call processing based on the first communication has been performed, the display control unit 114 displays the registered names on the display unit 15 as illustrated in FIG. 6C, FIG. 7C, and FIG. 8C.

More specifically, it is assumed that the hands-free call connection control unit 111 makes a call to the phone number of "Ichiro Kato" as new outgoing call processing based on the first communication. In this case, when the registered name of "Ichiro Kato" has been registered in the phone book data, the display control unit 114 reads the registered name of "Ichiro Kato" from the phone book data and displays the registered name on the display unit 15 as illustrated in FIG. 6C. Furthermore, it is assumed that as new incoming call processing based on the first communication, there is an incoming call from the phone number of "Ichiro Yoshimoto". In this case, when the incoming call number has been registered in the phone book data, the display control unit 114 reads the registered name of "Ichiro Yoshimoto" from the phone book data and displays the registered name on the display unit 15 as illustrated in FIG. 7C. Furthermore, when there is a new missed call based on the first communication from the phone number of "Saburo Watanabe", the display control unit 114 reads the registered name of "Saburo Watanabe" from the phone book data and displays registered name on the display unit 15 as illustrated in FIG. 8C.

Furthermore, it is assumed that there is a request to display first all history data, which displays the first outgoing call history data, the first incoming call history data, and the first missed call history data together in the latest time order. In this case, the display control unit 114 selects a predetermined number of first incoming call history data and first missed call history data with recent incoming call date and times or missed call date and times from all of the first incoming call history data and the first missed call history data, regardless of whether incoming call numbers or missed call numbers are duplicated for the first incoming call history data and the first missed call history data, and displays the selected first incoming call history data and first missed call history data on the display unit 15. Furthermore, the display control unit 114 selects only the latest first outgoing call history data from the first outgoing call history data in which outgoing call numbers are duplicated for the first outgoing call history data, and displays the selected first incoming call history data on the display unit 15.

FIG. 9 is a diagram illustrating an example of the first outgoing call history data, the first incoming call history data, the first missed call history data, and the first all history data according to the present embodiment. In the example illustrated in FIG. 9, the outgoing call number of "Taro Abe" is duplicated. In this case, the display control unit 114 displays, on the display unit 15, only outgoing call history with the latest outgoing call date and time (outgoing call history data with an outgoing call date and time of August 10/12:15) among the outgoing call history of "Taro Abe", and does not display outgoing call history with an outgoing call date and time that is not the latest.

Next, the transfer process of the second history data and the registration data described with reference to FIG. 5 and the like will be described in more detail.

FIG. 10A to FIG. 10C are diagrams illustrating an example of the correspondence between the second outgoing call history data and the registration data. FIG. 10A is an example of the second outgoing call history data stored in the mobile phone 2. FIG. 10B is an example of the registration data stored in the mobile phone 2. FIG. 10C is an example of the second outgoing call history data stored or displayed in the in-vehicle hands-free apparatus 1.

FIG. 11A to FIG. 11C are diagrams illustrating an example of the correspondence between the second incoming call history data and the registration data. FIG. 11A is an example of the second incoming call history data stored in the mobile phone 2. FIG. 11B is an example of the registration data stored in the mobile phone 2. FIG. 11C is an example of the second incoming call history data stored or displayed in the in-vehicle hands-free apparatus 1.

FIG. 12A to FIG. 12C are diagrams illustrating an example of the correspondence between the second missed call history data and the registration data. FIG. 12A is an example of the second missed call history data stored in the mobile phone 2. FIG. 12B is an example of the registration data stored in the mobile phone 2. FIG. 12C is an example of the second missed call history data stored or displayed in the in-vehicle hands-free apparatus 1. In FIG. 10A to FIG. 10C, FIG. 11A to FIG. 11C, FIG. 12A to FIG. 12C, and FIG. 13 to be described below, a portion denoted by 7-digit alphanumeric characters such as "XXXXXXX" corresponds to account information used as a call destination corresponding to an incoming call source and an outgoing call destination based on the second communication. The notation of the account information illustrated in FIG. 10A to FIG. 10C, FIG. 11A to FIG. 11C, FIG. 12A to FIG. 12C, and FIG. 13 is an example, and is not limited to 7-digit alphanumeric characters.

The data reception unit 103 receives, from the mobile phone 2, the second outgoing call history data including registered names, outgoing call destinations, and outgoing call date and times illustrated in FIG. 10A. The storage unit 104 stores therein the second outgoing call history data in the working memory 16 or the storage memory 17.

Furthermore, the data reception unit 103 receives, from the mobile phone 2, the second incoming call history data including registered names, incoming call sources, and incoming call date and times illustrated in FIG. 11A. The storage unit 104 stores therein the second incoming call history data in the working memory 16 or the storage memory 17.

Furthermore, the data reception unit 103 receives, from the mobile phone 2, the second missed call history data including a registered name, a missed call source, and an incoming call date and time illustrated in FIG. 12A. The storage unit 104 stores therein the second missed call history data in the working memory 16 or the storage memory 17.

No registered names may be included in the received second incoming call history data, second outgoing call history data, and second missed call history data. In this case, the storage unit 104 adds registered names to the second incoming call history data, the second outgoing call history data, and the second missed call history data by associating the incoming call sources or outgoing call destinations included in the second incoming call history data, the second outgoing call history data, and the second missed call history data with registered names associated with the voice call destinations in the registration data. Then, the storage unit 104 may store therein these second history data in the working memory 16 or the storage memory 17.

Then, upon receiving a request to display the second outgoing call history data, the second incoming call history data, and the second missed call history data, the display control unit 114 displays these second history data stored in the working memory 16 or the storage memory 17 on the display unit 15. That is, the display control unit 114 can display registered names transferred from the mobile phone 2 on the display unit 15 without reading registered names from the registration data stored in the working memory 16 or the storage memory 17.

The second history data may be stored in the working memory 16 or the storage memory 17 without including any registered names. In this case, the display control unit 114 displays the registered names associated with the incoming call sources or the outgoing call destinations included in the second history data on the display unit 15.

When the hands-free call connection control unit 111 completes the HFP connection process described with reference to FIG. 5, the user can process outgoing and incoming phone calls based on the first communication or the second communication by operating the operating unit 14 on the in-vehicle hands-free apparatus 1 side.

Furthermore, after the data transfer control unit 112 receives the second history data from the mobile phone 2 by the initial connection process with the mobile phone 2 described with reference to FIG. 5, new outgoing call processing, incoming call processing, or missed call processing based on the second communication may be performed in the in-vehicle hands-free apparatus 1 or the mobile phone 2. Thereafter, it is assumed that the user operates the operating unit 14 to request the display of the second history data. In this case, when the registration data includes registered names corresponding to voice call destinations corresponding to outgoing call destinations and incoming call sources for which the new outgoing call processing, incoming call processing, or missed call processing based on the second communication has been performed, the display control unit 114 displays the registered names on the display unit 15 as illustrated in FIG. 10C, FIG. 11C, and FIG. 11C.

Furthermore, it is assumed that there is a request to display second all history data, which displays the second outgoing call history data, the second incoming call history data, and the second missed call history data together in the latest time order. In this case, the display control unit 114 selects a predetermined number of second incoming call history data and second missed call history data with recent incoming call date and times or missed call date and times from all of the second incoming call history data and the second missed call history data, regardless of whether incoming call sources are duplicated for the second incoming call history data and the second missed call history data, and displays the selected second incoming call history data and second missed call history data on the display unit 15. Furthermore, the display control unit 114 selects only the latest second outgoing call history data from the second outgoing call history data in which outgoing call destinations are duplicated for the second outgoing call history data, and displays the selected second incoming call history data on the display unit 15.

FIG. 13 is a diagram illustrating an example of second all history data according to the present embodiment. In this way, the display control unit 114 may display the second all history data on the display unit 15.

The data reception unit 103 of the in-vehicle hands-free apparatus 1 may receive the first all history data from the mobile phone 2 as the first history data, and receive the second all history data from the mobile phone 2 as the second history data.

Next, the procedure of outgoing call processing and incoming call processing based on each of the first communication and the second communication in the in-vehicle hands-free apparatus 1 will be described. Hereinafter, a mode using the first outgoing call history data, the second outgoing call history data, the first incoming call history data, and the second incoming call history data will be described, but the same applies to the first missed call history data and the second missed call history data.

Figure 14:
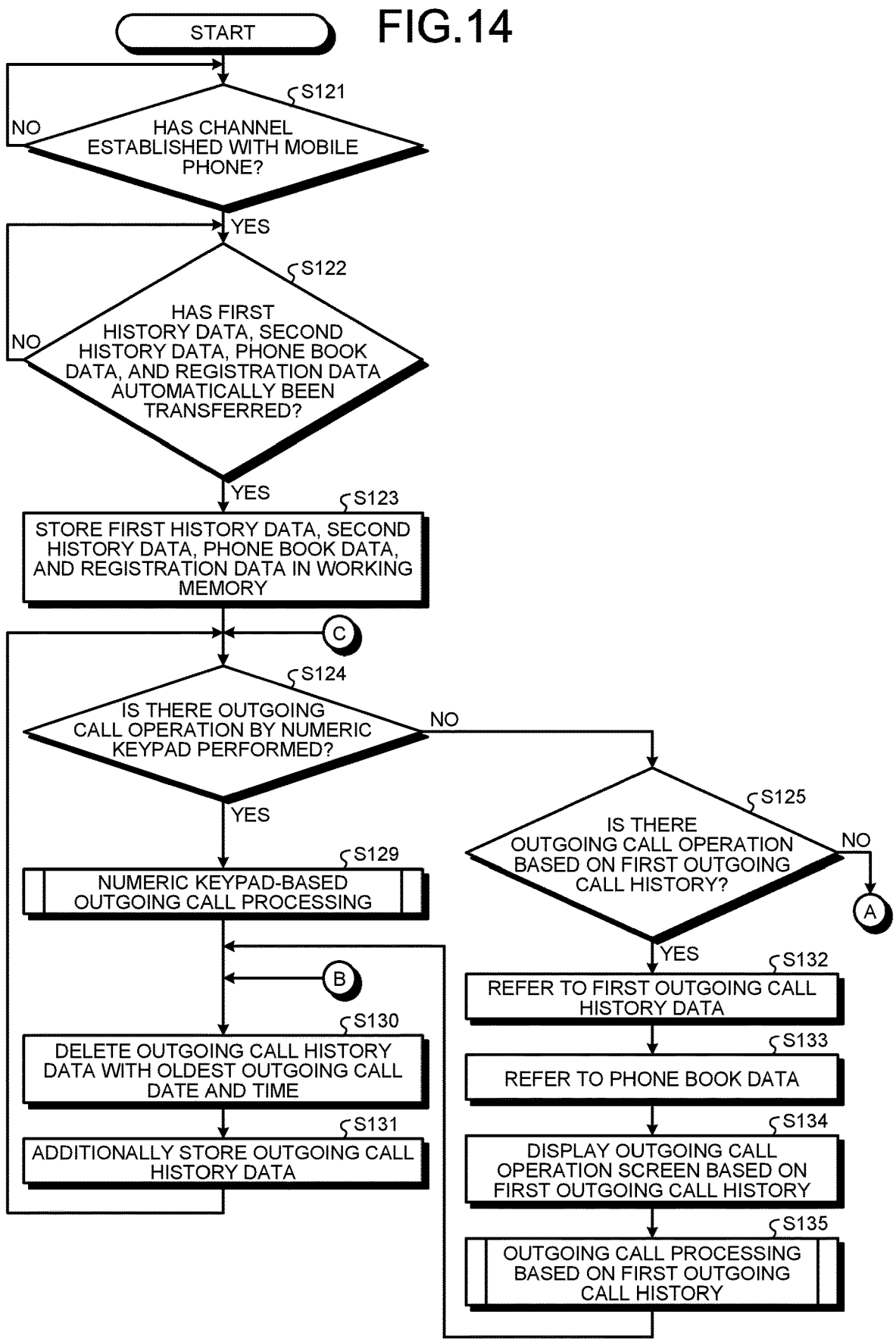
FIG. 14 is a diagram illustrating an example of a flow of outgoing call processing and incoming call processing.
Figure 15:
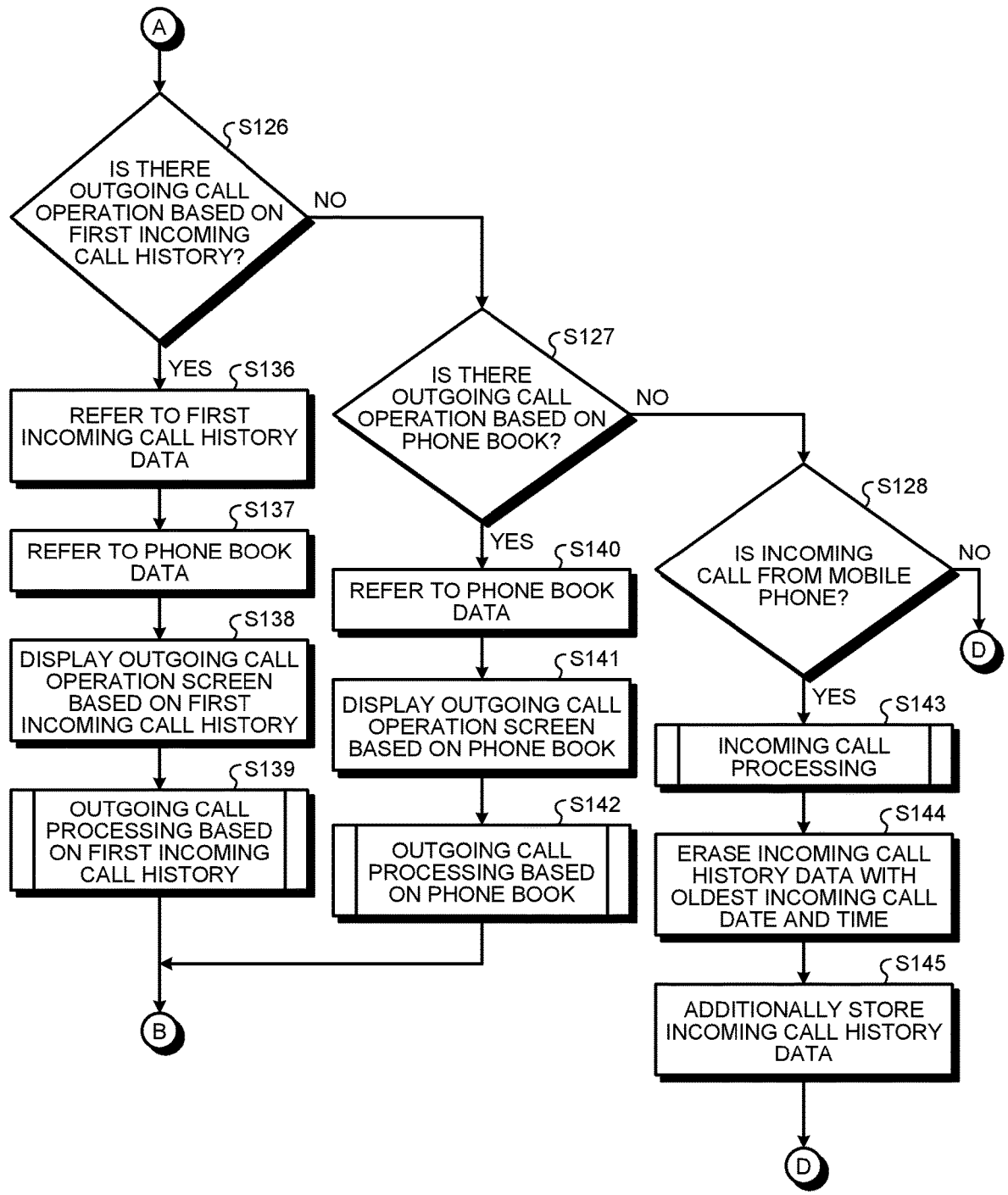
FIG. 15 is a diagram illustrating an example of a flow of outgoing call processing and incoming call processing.
Figure 16:
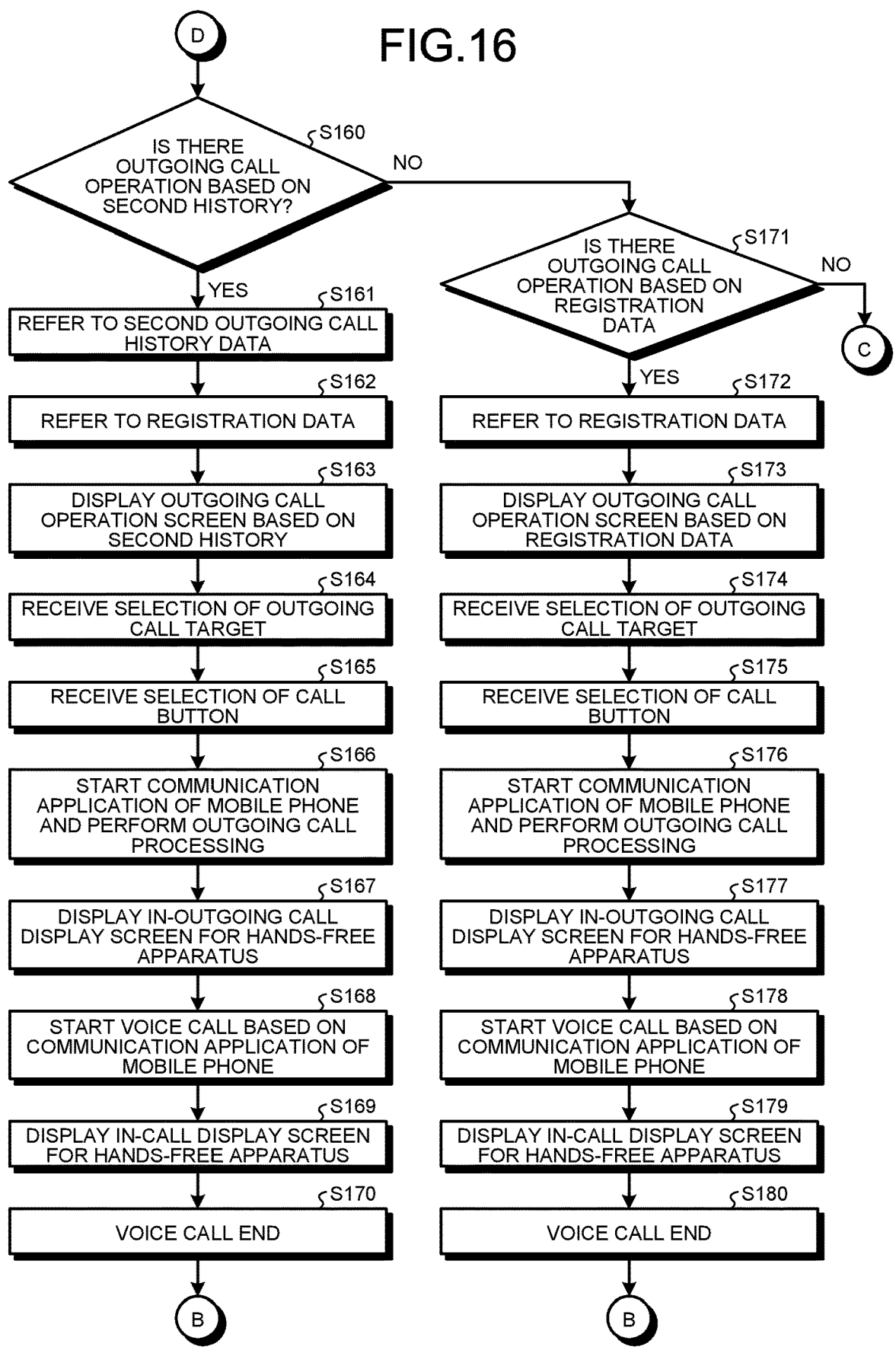
FIG. 16 is a diagram illustrating an example of a flow of outgoing call processing and incoming call processing.

FIG. 14 to FIG. 16 illustrate an example of the flow of outgoing call processing and incoming call processing based on the first communication and the second communication performed by the in-vehicle hands-free apparatus 1 of the present embodiment. The process performed by the control device 12 in FIG. 14 to FIG. 16 is, for example, a process implemented by the control unit 102 or the like described with reference to FIG. 3.

Figure 19A:
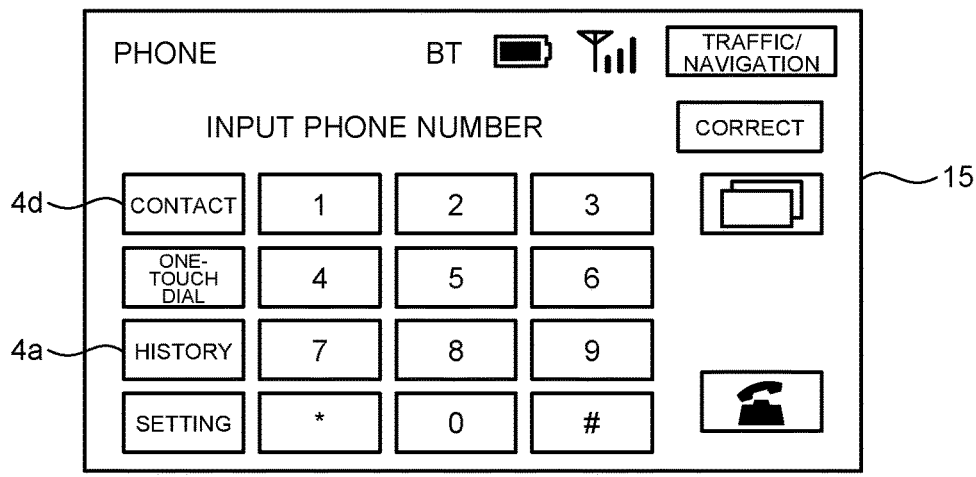
FIG. 19A is a diagram illustrating the transition of a display screen when an outgoing call operation is performed from first outgoing call history.
Figure 19B:
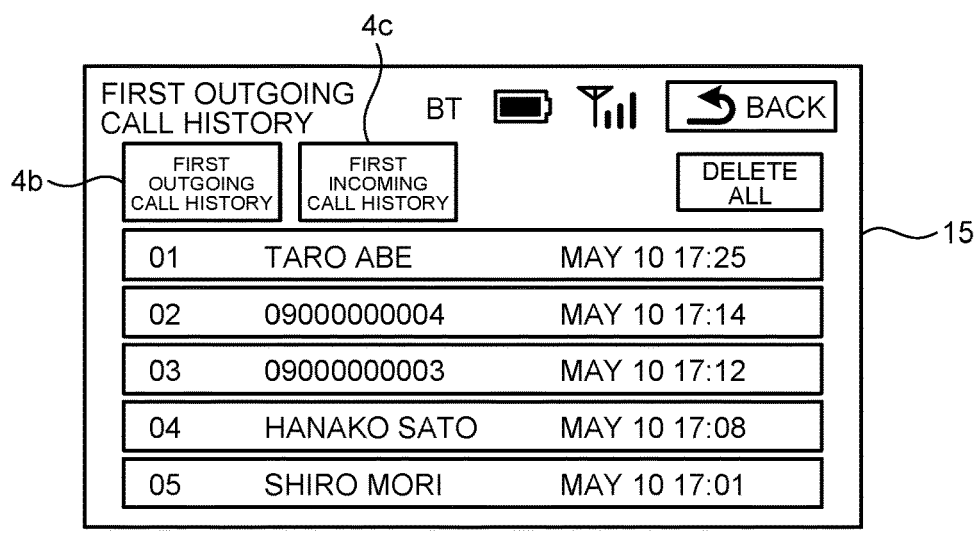
FIG. 19B is a diagram illustrating the transition of a display screen when an outgoing call operation is performed from first outgoing call history.
Figure 19C:
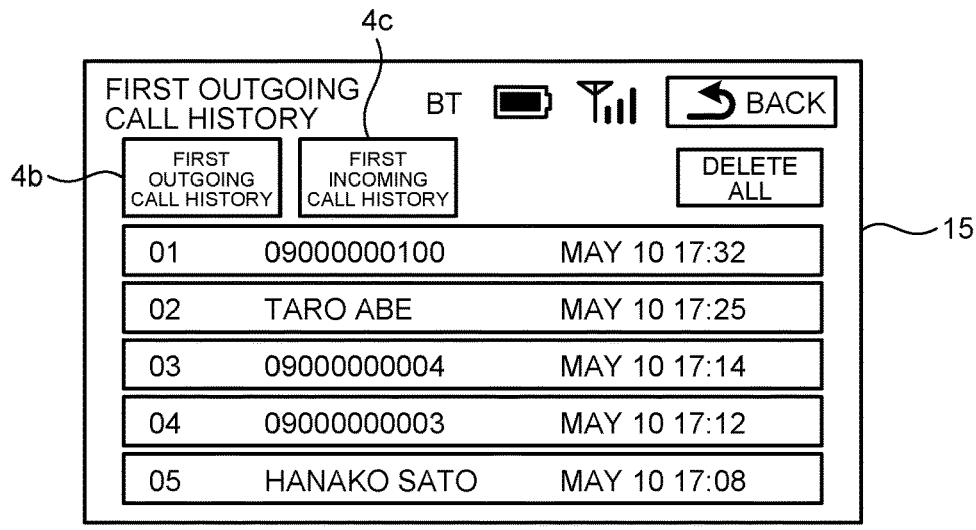
FIG. 19C is a diagram illustrating the transition of a display screen when an outgoing call operation is performed from first outgoing call history.
Figure 20A:
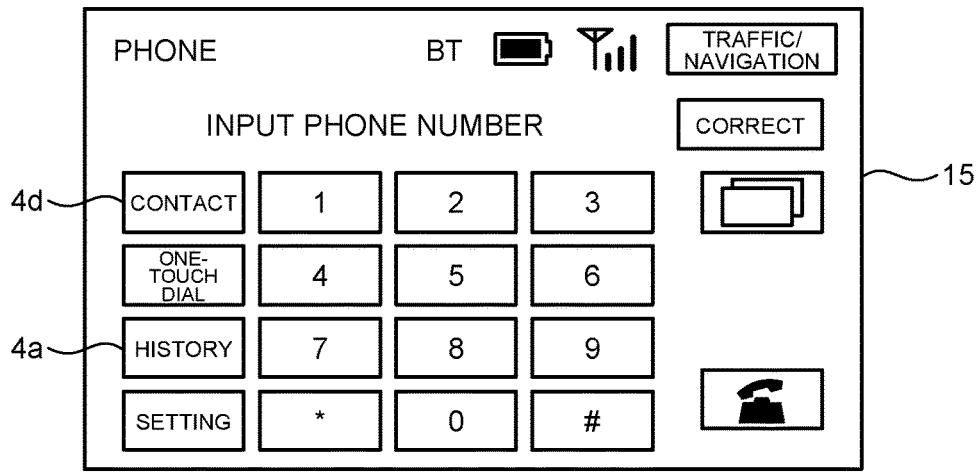
FIG. 20A is a diagram illustrating the transition of a display screen when an outgoing call operation is performed from first incoming call history.
Figure 20B:
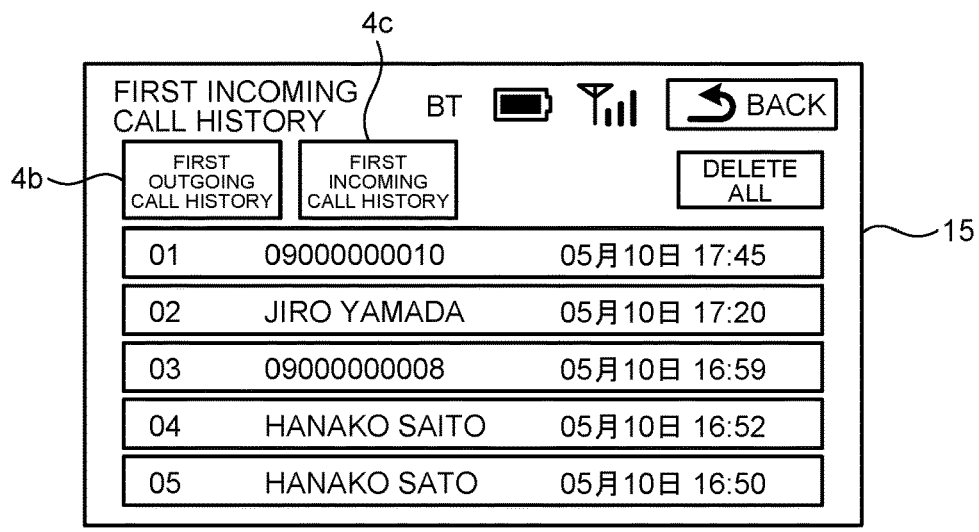
FIG. 20B is a diagram illustrating the transition of a display screen when an outgoing call operation is performed from first incoming call history.
Figure 20C:
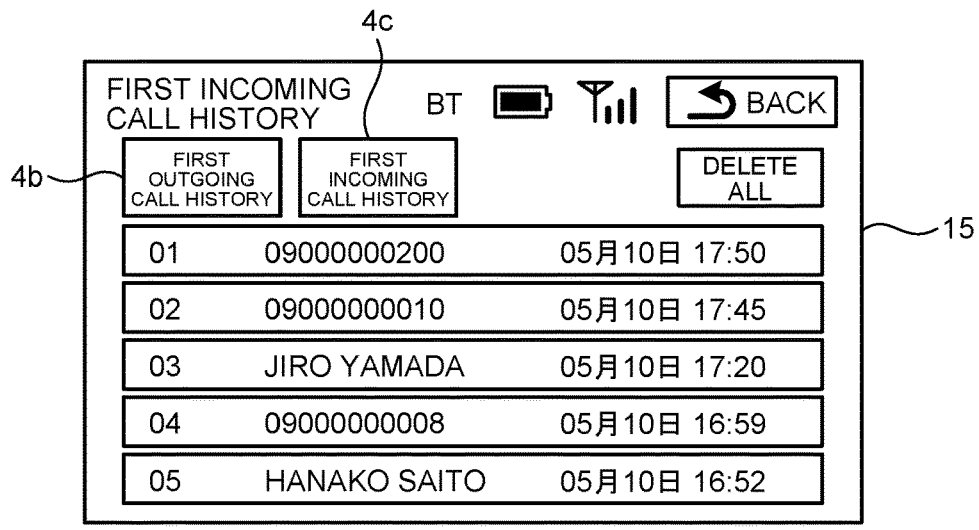
FIG. 20C is a diagram illustrating the transition of a display screen when an outgoing call operation is performed from first incoming call history.
Figure 21A:
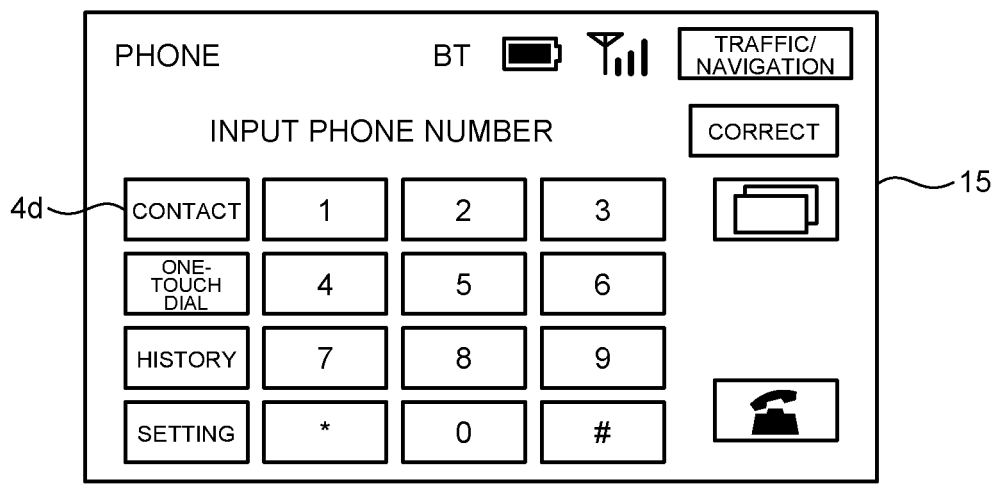
FIG. 21A is a diagram illustrating the transition of a display screen when an outgoing call operation is performed from a phone book.
Figure 21B:
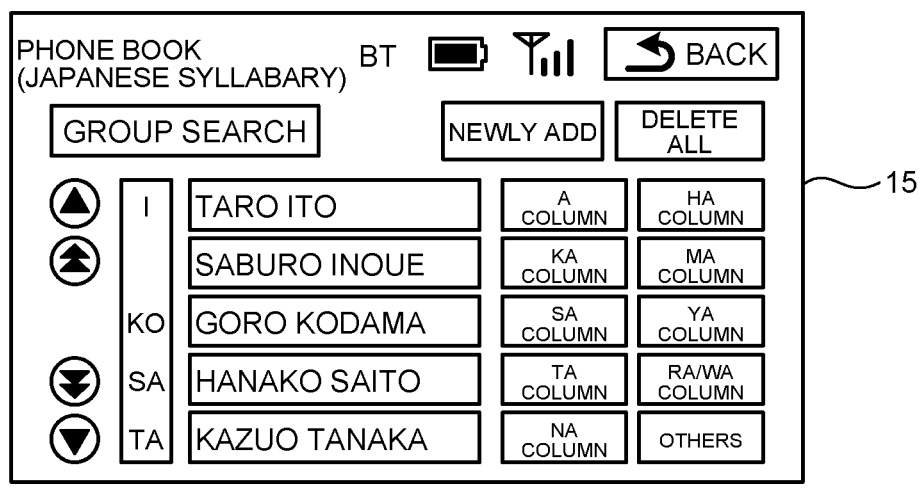
FIG. 21B is a diagram illustrating the transition of a display screen when an outgoing call operation is performed from a phone book.

FIG. 17A and FIG. 17B to be described with reference to FIG. 14 to FIG. 16 are diagrams illustrating an example of the first outgoing call history data. FIG. 18A and FIG. 18B are diagrams illustrating an example of the first incoming call history data. FIG. 19A to FIG. 19C are diagrams illustrating an example of the transition of a display screen when the user performs an outgoing call operation from first outgoing call history of the first outgoing call history data. FIG. 20A to FIG. 20C are diagrams illustrating an example of the transition of a display screen when the user performs an outgoing call operation from first incoming call history of the first incoming call history data. FIG. 21A and FIG. 21B illustrate an example of the transition of a display screen when the user performs an outgoing call operation from a phone book of the phone book data.

FIG. 22A to FIG. 22E to be described with reference to FIG. 14 to FIG. 16 are diagrams illustrating an example of the transition of display screens of the in-vehicle hands-free apparatus 1 and the mobile phone 2 in the case of performing an outgoing call operation from second history of the second history data. FIG. 23A to FIG. 23E are diagrams illustrating an example of the transition of the display screens of the in-vehicle hands-free apparatus 1 and the mobile phone 2 in the case of performing an outgoing call operation from the registration data.

Figure 24A:
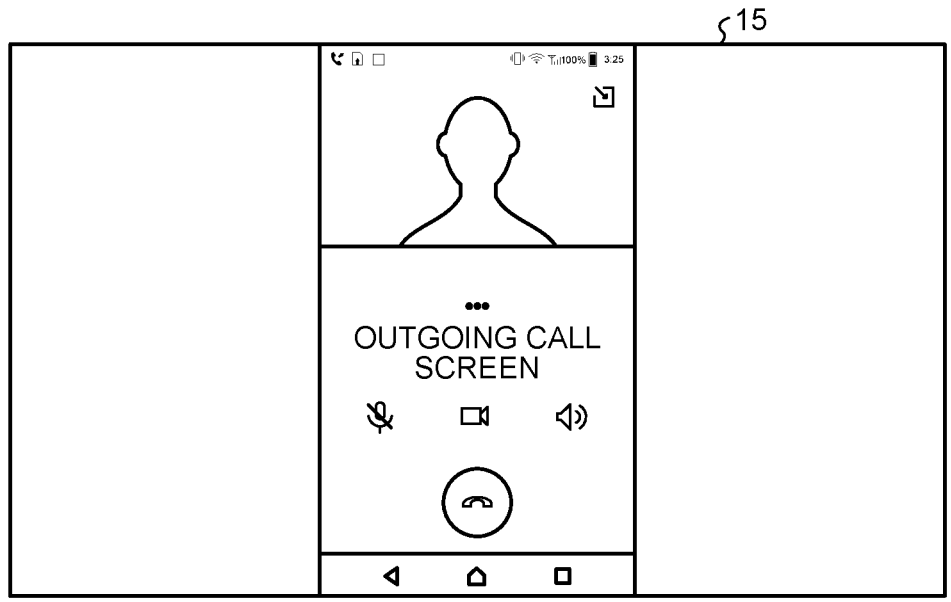
FIG. 24A is a diagram illustrating the transition of a display screen when an outgoing call operation is performed from second history.
Figure 24B:
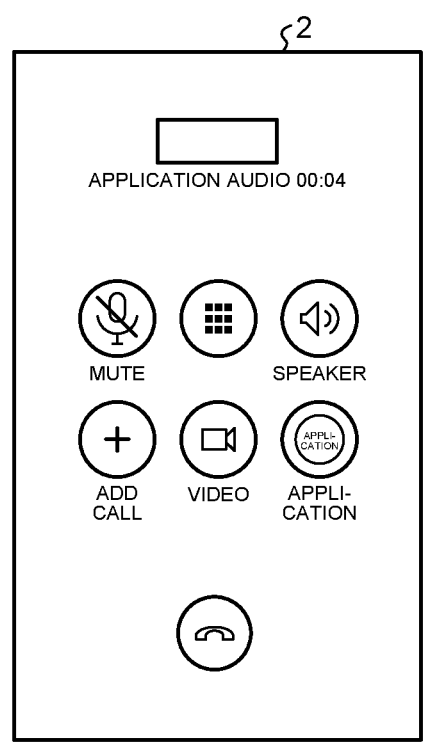
FIG. 24B is a diagram illustrating the transition of a display screen when an outgoing call operation is performed from second history.
Figure 24C:
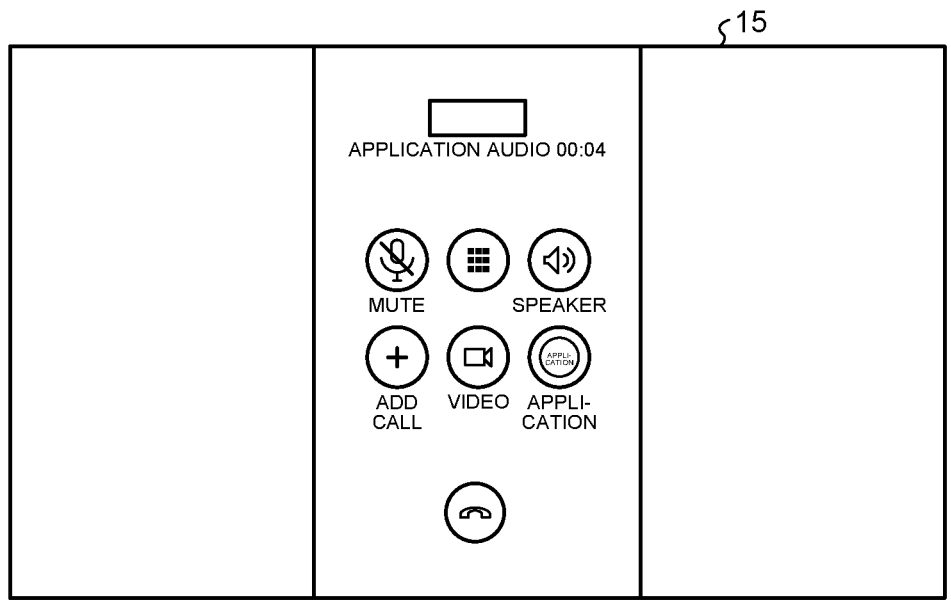
FIG. 24C is a diagram illustrating the transition of a display screen when an outgoing call operation is performed from second history.
Figure 25A:
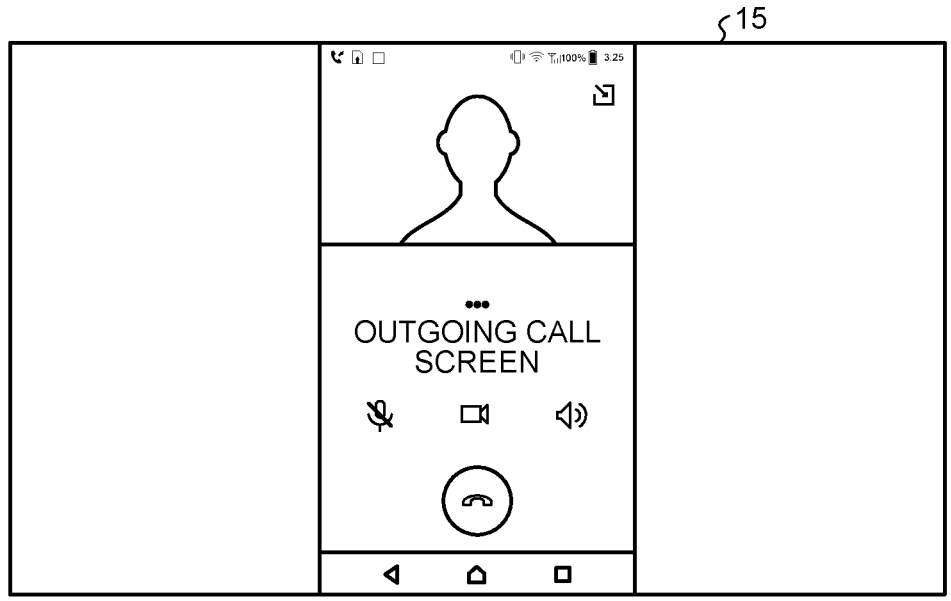
FIG. 25A is a diagram illustrating the transition of a display screen when an outgoing call operation is performed from registration data.
Figure 25B:
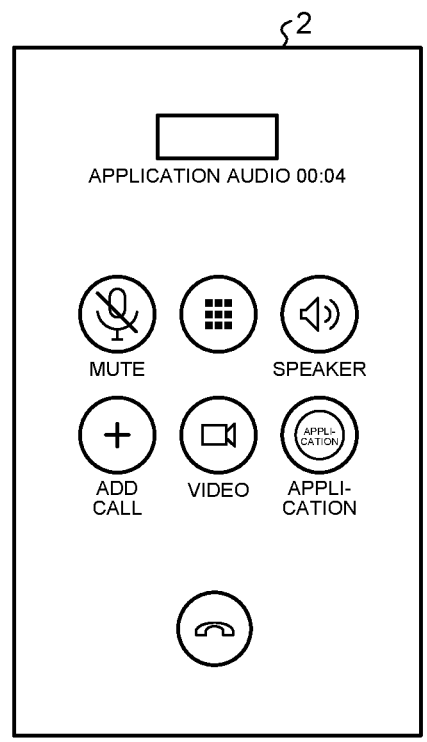
FIG. 25B is a diagram illustrating the transition of a display screen when an outgoing call operation is performed from registration data.
Figure 25C:
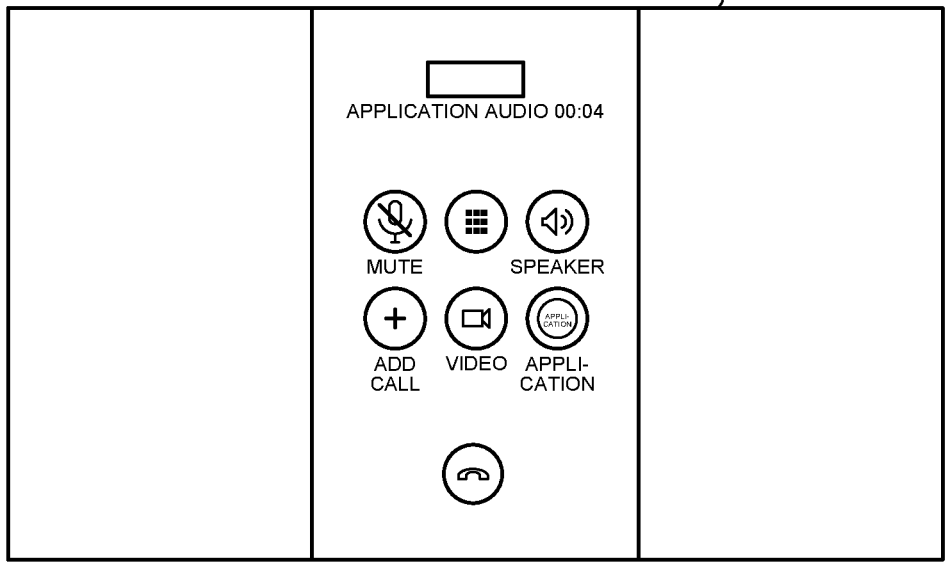
FIG. 25C is a diagram illustrating the transition of a display screen when an outgoing call operation is performed from registration data.

FIG. 24A to FIG. 24C are diagrams illustrating another example of the transition of the display screens of the in-vehicle hands-free apparatus 1 and the mobile phone 2 in the case of performing an outgoing call operation from the second history of the second history data. FIG. 25A to FIG. 25C are diagrams illustrating another example of the transition of the display screens of the in-vehicle hands-free apparatus 1 and the mobile phone 2 in the case of performing an outgoing call operation from the registration data.

Returning back to FIG. 14 to continue the description.

First, the control unit 102 of the in-vehicle hands-free apparatus 1 determines whether the mobile phone 2 exists in the Bluetooth communication range of the in-vehicle hands-free apparatus 1 and the Bluetooth communication unit 13 has established a channel with the mobile phone 2 (S121). The control unit 102 repeats a negative determination (No at S121) until a positive determination is made, and proceeds to S122 when a positive determination is made (Yes at S121).

At S122, the control unit 102 waits until the first history data, the second history data, the phone book data, and the registration data are automatically transferred from the mobile phone 2 to the Bluetooth communication unit 13 (S122).

When the first history data, the second history data, the phone book data, and the registration data are automatically transferred from the mobile phone 2 (Yes at S122), the control unit 102 stores these data in the working memory 16 or the storage memory 17 (S123).

It is assumed that the numbers of first history data and second history data automatically transferred from the mobile phone 2 are each 20, for example. Furthermore, it is assumed that numbers of the first history data and second history data storable in the working memory 16 are each 5, for example. That is, the numbers of first history data and second history data storable in the working memory 16 may be smaller than the numbers of first history data and second history data automatically transferred from the mobile phone 2.

In this case, for example, the control unit 102 discards first outgoing call history data with an old outgoing call date and time among the first outgoing call history data automatically transferred from the mobile phone 2, and preferentially stores five pieces of first outgoing call history data with recent outgoing call date and times in the working memory 16. In the same way, for the first incoming call history data, the second outgoing call history data, and the second incoming call history data, the control unit 102 preferentially stores five pieces of the latest history data in the working memory 16.

For example, immediately after the first outgoing call history data is automatically transferred from the mobile phone 2, the control unit 102 retains first outgoing call history data illustrated in FIG. 17A as first outgoing call history data of the working memory 16. Furthermore, when the user performs an operation for displaying the first outgoing call history data from this state, the control unit 102 displays a display screen illustrated in FIG. 19B on the display unit 15. Furthermore, immediately after the first incoming call history data is automatically transferred from the mobile phone 2, the control unit 102 retains first incoming call history data illustrated in FIG. 18A as incoming call history data of the working memory 16. Furthermore, when the user performs an operation for displaying the first incoming call history data from this state, the control unit 102 displays a display screen illustrated in FIG. 20B on the display unit 15.

In this way, when the mobile phone 2 and the in-vehicle hands-free apparatus 1 establish a Bluetooth channel, the first history data and the second history data stored before the mobile phone 2 establishes the Bluetooth channel are automatically transferred to the working memory 16 of the in-vehicle hands-free apparatus 1. Therefore, the mobile phone 2 and the in-vehicle hands-free apparatus 1 constitute one phone system, and the phone system enables hands-free voice calls. After the phone system is configured, the user can make a call by using the numeric keypad input, make a call based on the first communication or the second communication by using any of the first history data, the second history data, the phone book data, and the registration data, and wait for an incoming call.

In the present embodiment, as described with reference to FIG. 5, serial profile switching, in which the PBAP-based wireless communication connection is made, the PBAP-based wireless communication is disconnected, and then the HFP-based wireless communication connection is made, is performed as a procedure for Bluetooth communication. Therefore, after the HFP-based wireless communication connection, when a new incoming call is made to the mobile phone 2 or a new outgoing call is processed by the operating unit 14, first history data and second history data including the incoming call and the outgoing call are retained in the mobile phone 2. Therefore, the control unit 102 of the in-vehicle hands-free apparatus 1 can also perform simultaneous connection, which is PBAP-based wireless communication, during the HFP-based wireless communication in order to re-acquire the latest first history data and second history data from the mobile phone 2.

However, in the case of avoiding the simultaneous connection as much as possible, when the HFP-based wireless communication connection is disconnected and the PBAP-based wireless communication connection is made in the serial connection, the mobile phone 2 and the in-vehicle hands-free apparatus 1 constituting one phone system are separated from each other during that time. Therefore, in this case, hands-free voice calls may not be made. In this regard, in the present embodiment, when the HFP connection process is performed at S2 of FIG. 5, the in-vehicle hands-free apparatus 1 self-acquires and self-manages the latest first history data and second history data only by the HFP-based wireless communication connection even after that.

Returning back to the flowchart of FIG. 14 to continue the description.

The control unit 102 determines whether an outgoing call operation by user's numeric keypad input is received (S124). For example, the control unit 102 displays a display screen illustrated in FIG. 19A on the display unit 15. The user operates the operating unit 14 to make numeric keypad input on the display screen and operates a call button. This allows the control unit 102 to receive the outgoing call operation by the user's numeric keypad input.

When it is determined that the user has performed the outgoing call operation by the numeric keypad input (Yes at S124), the control unit 102 performs outgoing call processing of making a call by the first communication by using an input phone number as an outgoing call number (S129).

Specifically, for example, the control unit 102 transmits, to the mobile phone 2, an instruction to start the phone application 8A of the mobile phone 2 and a signal indicating the outgoing call number of the input phone number. The mobile phone 2 starts the phone application 8A in response to the received startup instruction. Then, the mobile phone 2 performs the outgoing call processing of making a call to the outgoing call number received from the in-vehicle hands-free apparatus 1, by the first communication using the phone application 8A.

When the control unit 102 ends the outgoing call processing based on the first communication in response to the numeric keypad input, the control unit 102 deletes first outgoing call history data with the oldest outgoing call date and time among the first outgoing call history data stored in the working memory 16 at that time (S130), as illustrated in FIG. 17B. Then, the control unit 102 additionally stores the latest first outgoing call history data of the in-vehicle hands-free apparatus 1, which represents an outgoing call made by numeric keypad input, in the working memory 16 (S131).

It is assumed that the user operates the numeric keypad to enter, for example, a phone number "09000000100" and makes a call using the phone number "09000000100" as an outgoing call number. In this case, as illustrated in FIG. 17B, the control unit 102 additionally stores first outgoing call history data representing the phone number "09000000100" in the working memory 16. In this case, the control unit 102 stores, as a time stamp, the date and time acquired by the GPS device of the in-vehicle hands-free apparatus 1 as an outgoing call date and time corresponding to the phone number "09000000100". That is, in FIG. 17B, the outgoing call date and time of the latest phone number "09000000100" is the date and time acquired by the GPS device of the in-vehicle hands-free apparatus 1, and the outgoing call date and times of the remaining four phone numbers are the date and times acquired by the clock unit of the mobile phone 2. When the user performs an operation for displaying the first outgoing call history data from this state, the control unit 102 displays a display screen illustrated in FIG. 19C on the display unit 15.

Returning back to FIG. 14 to continue the description. When a negative determination is made at S124 (No at S124), the control unit 102 proceeds to S125. At S125, the control unit 102 determines whether an outgoing call operation based on the first outgoing call history of the first outgoing call history data is received from the user (S125).

For example, the control unit 102 displays the display screen illustrated in FIG. 19A on the display unit 15. It is assumed that a "history" button 4a is pressed by an operation instruction of the operating unit 14 from the user and a "first outgoing call history" button 4b illustrated in FIG. 19B is further operated. In this case, the control unit 102 determines that the outgoing call operation based on the first outgoing call history has been received (Yes at S125) and proceeds to S132.

At S132, the control unit 102 refers to the first outgoing call history data stored in the working memory 16 (S132), and refers to the phone book data stored in the working memory 16 (S133). Then, as illustrated in FIG. 19B and FIG. 19C, the control unit 102 displays an outgoing call operation screen based on the first outgoing call history of the first outgoing call history data on the display unit 15 (S134). In this case, when the outgoing call number of the first outgoing call history data has been registered in the phone book data, the control unit 102 displays a registered name corresponding to the outgoing call number on the display unit 15. On the other hand, when the outgoing call number of the first outgoing call history data has not been registered in the phone book data, the control unit 102 displays the outgoing call number on the display unit 15.

Next, the control unit 102 performs outgoing call processing of making a call by the first communication by using a phone number selected by the user as an outgoing call number (S135).

Specifically, for example, the control unit 102 transmits, to the mobile phone 2, an instruction to start the phone application 8A of the mobile phone 2 and a signal indicating the outgoing call number of the selected phone number. The mobile phone 2 starts the phone application 8A in response to the received startup instruction. Then, the mobile phone 2 performs the outgoing call processing of making a call to the outgoing call number received from the in-vehicle hands-free apparatus 1, by the first communication using the phone application 8A.

That is, when the outgoing call number is selected as an outgoing call target via the outgoing call operation screen of the first outgoing call history, the control unit 102 sets the selected outgoing call target as a voice call destination and performs outgoing call processing of making a call by the first communication via the mobile phone 2.

Then, when an incoming call is accepted at the voice call destination, the control unit 102 implements a voice call based on the first communication with the voice call destination via the phone application 8A of the mobile phone 2.

Then, the control unit 102 returns back to S130 above. That is, when the outgoing call processing based on the first outgoing call history and the voice call are ended, the control unit 102 performs the same processes as those of S130 and S131. That is, the control unit 102 erases first outgoing call history data with the oldest outgoing call date and time among the first outgoing call history data stored in the working memory 16 at that time, and additionally stores the latest first outgoing call history data in the working memory 16. Then, the control unit 102 stores, as a time stamp, the date and time acquired by the GPS device of the in-vehicle hands-free apparatus 1 as an outgoing call date and time corresponding to the outgoing call number.

On the other hand, when a negative determination is made at S125 (No at S125), the control unit 102 proceeds to S126 in FIG. 15.

At S126, the control unit 102 determines whether an outgoing call operation based on the first incoming call history of the first incoming call history data is received from the user (S126).

For example, the control unit 102 displays a display screen illustrated in FIG. 20A on the display unit 15. It is assumed that the "history" button 4a is pressed by an operation instruction of the operating unit 14 from the user and a "first incoming call history" button 4c illustrated in FIG. 20B is further operated. In this case, the control unit 102 determines that the outgoing call operation based on the first incoming call history has been received (Yes at S126) and proceeds to S136.

At S136, the control unit 102 refers to the first incoming call history data stored in the working memory 16 (S136), and refers to the phone book data stored in the working memory 16 (S137). Then, as illustrated in FIG. 20B and FIG. 20C, the control unit 102 displays an outgoing call operation screen based on the second incoming call history of the second incoming call history data on the display unit 15 (S138). In this case, when the outgoing call number of the second incoming call history data has been registered in the phone book data, the control unit 102 displays a registered name corresponding to the outgoing call number on the display unit 15. On the other hand, when the outgoing call number of the second incoming call history data has not been registered in the phone book data, the control unit 102 displays the outgoing call number on the display unit 15.

Next, the control unit 102 performs outgoing call processing of making a call by the first communication by using a phone number selected by the user as an outgoing call number (S139).

Specifically, for example, the control unit 102 transmits, to the mobile phone 2, an instruction to start the phone application 8A of the mobile phone 2 and a signal indicating the outgoing call number of the selected phone number. The mobile phone 2 starts the phone application 8A in response to the received startup instruction. Then, the mobile phone 2 performs the outgoing call processing of making a call to the outgoing call number received from the in-vehicle hands-free apparatus 1, by the first communication using the phone application 8A.

That is, when the outgoing call number is selected as an outgoing call target via the outgoing call operation screen of the first incoming call history, the control unit 102 sets the selected outgoing call target as a voice call destination and performs outgoing call processing of making a call by the first communication via the mobile phone 2.

Then, when an incoming call is accepted at the voice call destination, the control unit 102 implements a voice call based on the first communication with the voice call destination via the phone application 8A of the mobile phone 2.

Then, the control unit 102 returns back to S130 above. That is, when the outgoing call processing based on the first incoming call history and the voice call are ended, the control unit 102 performs the same processes as those of S130 and S131. That is, the control unit 102 erases first outgoing call history data with the oldest outgoing call date and time among the second outgoing call history data stored in the working memory 16 at that time, and additionally stores the latest first outgoing call history data in the working memory 16. Then, the control unit 102 stores, as a time stamp, the date and time acquired by the GPS device of the in-vehicle hands-free apparatus 1 as an outgoing call date and time corresponding to the outgoing call number.

When a negative determination is made at S126 (No at S126), the control unit 102 proceeds to S127. At S127, the control unit 102 determines whether an outgoing call operation based on the phone book data is received from the user (S127).

For example, the control unit 102 displays a display screen illustrated in FIG. 21A on the display unit 15. It is assumed that a "contact" 4d button is pressed by an operation instruction of the operating unit 14 from the user and a phone book button is further operated. In this case, the control unit 102 determines that the outgoing call operation based on the phone book has been received (Yes at S127) and proceeds to S140.

At S140, the control unit 102 refers to the phone book data (S140). Then, the control unit 102 displays a phone book-based outgoing call operation screen illustrated in FIG. 21B on the display unit 15 (S141). The control unit 102 performs outgoing call processing of making a call by the first communication by using a phone number selected by the user as an outgoing call number (S142).

Specifically, for example, the control unit 102 transmits, to the mobile phone 2, an instruction to start the phone application 8A of the mobile phone 2 and a signal indicating the outgoing call number of the selected phone number. The mobile phone 2 starts the phone application 8A in response to the received startup instruction. Then, the mobile phone 2 performs the outgoing call processing of making a call to the outgoing call number received from the in-vehicle hands-free apparatus 1, by the first communication using the phone application 8A.

That is, when the outgoing call number is selected as an outgoing call target via the outgoing call operation screen of the phone book data, the control unit 102 sets the selected outgoing call target as a voice call destination and performs outgoing call processing of making a call by the first communication via the mobile phone 2.

Then, when an incoming call is accepted at the voice call destination, the control unit 102 implements a voice call based on the first communication with the voice call destination via the phone application 8A of the mobile phone 2.

Then, the control unit 102 returns back to S130 above. That is, when the outgoing call processing based on the phone book and the voice call are ended, the control unit 102 performs the same processes as those of S130 and S131. That is, the control unit 102 erases first outgoing call history data with the oldest outgoing call date and time among the first outgoing call history data stored in the working memory 16 at that time, and additionally stores the latest first outgoing call history data in the working memory 16. Then, the control unit 102 stores, as a time stamp, the date and time acquired by the GPS device of the in-vehicle hands-free apparatus 1 as an outgoing call date and time corresponding to the outgoing call number.

When a negative determination is made at S127 (No at S127), the control unit 102 proceeds to S128. At S128, the control unit 102 determines whether an incoming call is received from the mobile phone 2 via the Bluetooth communication unit 13 by the first communication or the second communication (S128).

When a positive determination is made at S128 (Yes at S128), the control unit 102 performs incoming call processing such as notification for notifying an incoming call by the first communication or the second communication (S143).

For example, it is assumed that the control unit 102 receives an incoming call based on the first communication and the user accepts the incoming call. In this case, the control unit 102 performs incoming call processing of implementing a voice call based on the first communication with an incoming call source having received the incoming call via the phone application 8A of the mobile phone 2. Furthermore, for example, it is assumed that the control unit 102 receives an incoming call based on the second communication and the user accepts the incoming call. In this case, the control unit 102 performs incoming call processing of implementing a voice call based on the second communication with an incoming call source having received the incoming call via the communication application 8B of the mobile phone 2.

Then, when the incoming call processing is ended, the control unit 102 erases incoming call history data with the oldest incoming call date and time among the incoming call history data stored in the working memory 16 at that time (S144). Then, the control unit 102 additionally stores the latest incoming call history data in the working memory 16 (S145).

That is, when an incoming call based on the first communication is received, the control unit 102 erases the oldest first incoming call history data among the first incoming call history data stored in the working memory 16. Then, the control unit 102 additionally stores the latest first incoming call history data in the working memory 16. Similarly, when an incoming call based on the second communication is received, the control unit 102 erases the oldest second incoming call history data among the second incoming call history data stored in the working memory 16. Then, the control unit 102 additionally stores the latest second incoming call history data in the working memory 16. Then, the control unit 102 returns back to S124 above.

When a negative determination is made at S128 (No at S128), the control unit 102 proceeds to S160 illustrated in FIG. 16.

The control unit 102 determines whether an outgoing call operation based on the second history of the second history data is received from the user (S160).

Figure 22A:
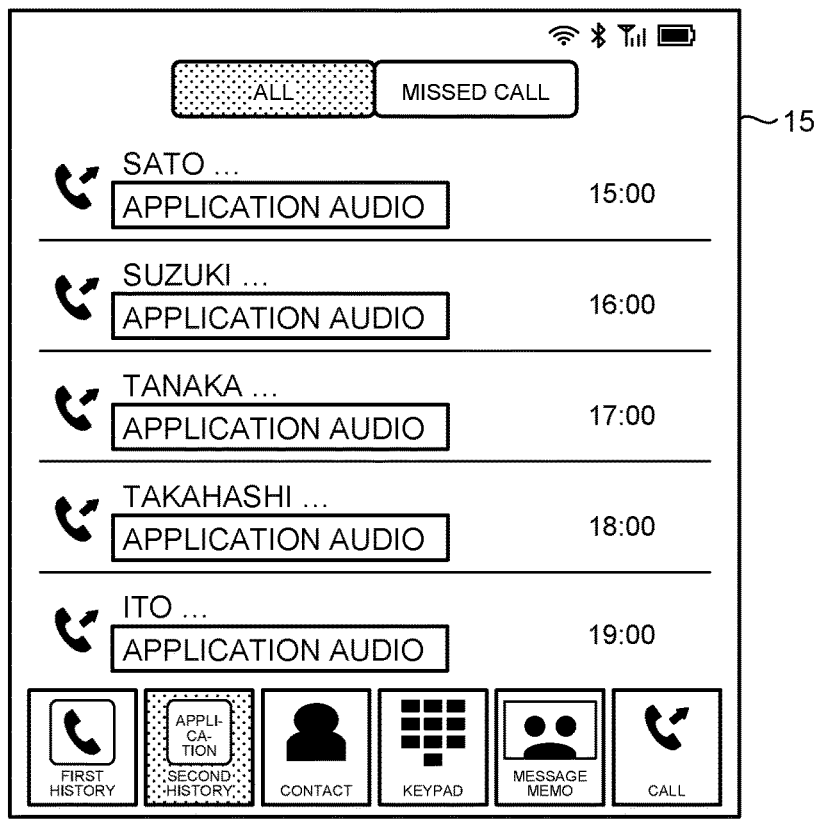
FIG. 22A is a diagram illustrating the transition of a display screen when an outgoing call operation is performed from second history.

For example, the control unit 102 displays the display screen illustrated in FIG. 21A on the display unit 15. It is assumed that the "history" button 4a is pressed by an operation instruction of the operating unit 14 from the user and a "second history" button illustrated in FIG. 22A is further operated. In this case, the control unit 102 determines that the outgoing call operation based on the second history of the second history data has been received (Yes at S160) and proceeds to S161.

At S161, the control unit 102 refers to the second history data stored in the working memory 16 (S161), and refers to the registration data stored in the working memory 16 (S162).

Then, as illustrated in FIG. 22A, the control unit 102 displays an outgoing call operation screen based on the second history of the second history data on the display unit 15 (S163). That is, the control unit 102 displays, on the display unit 15, an outgoing call operation screen for allowing an outgoing call operation by the user with respect to at least one of an incoming call source represented by the second incoming call history data and an outgoing call destination represented by the second outgoing call history data.

The user selects second history data to be sent out from the displayed second history data via the outgoing call operation screen displayed on the display unit 15, and operates the "call" button. The control unit 102 receives the selection of the outgoing call target according to the user's operation instruction (S164), and further receives the selection of the "call" button (S165).

The control unit 102 starts the communication application 8B of the mobile phone 2, and performs outgoing call processing of making a call to an incoming call source or an outgoing call destination of the selected second history data by the second communication (S166).

For example, the control unit 102 transmits, to the mobile phone 2, an instruction to start the communication application 8B and a signal indicating a voice call destination (account information) representing an incoming call source or an outgoing call destination. The mobile phone 2 starts the communication application 8B in response to the received startup instruction. Then, the mobile phone 2 performs the outgoing call processing of making a call to the voice call destination received from the in-vehicle hands-free apparatus 1, by the second communication using the communication application 8B.

That is, when an incoming call source included in the second incoming call history data or an outgoing call destination included in the second outgoing call history data is selected as an outgoing call target via the outgoing call operation screen of the second history data, the control unit 102 sets the selected outgoing call target as a voice call destination and performs outgoing call processing of making a call by the second communication via the mobile phone 2.

Figure 22B:
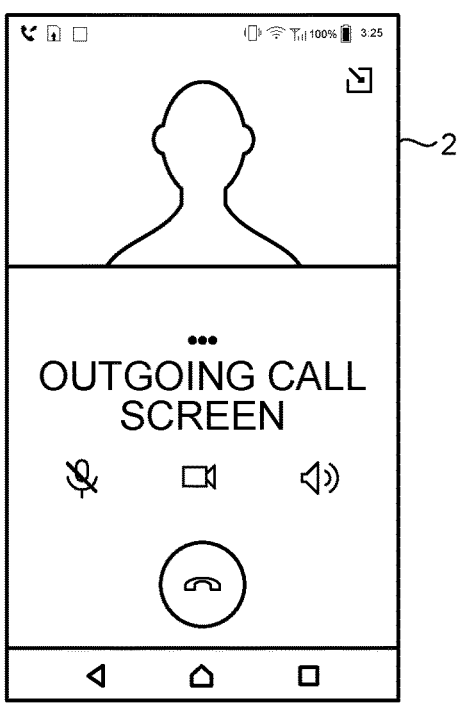
FIG. 22B is a diagram illustrating the transition of a display screen when an outgoing call operation is performed from second history.
Figure 22C:
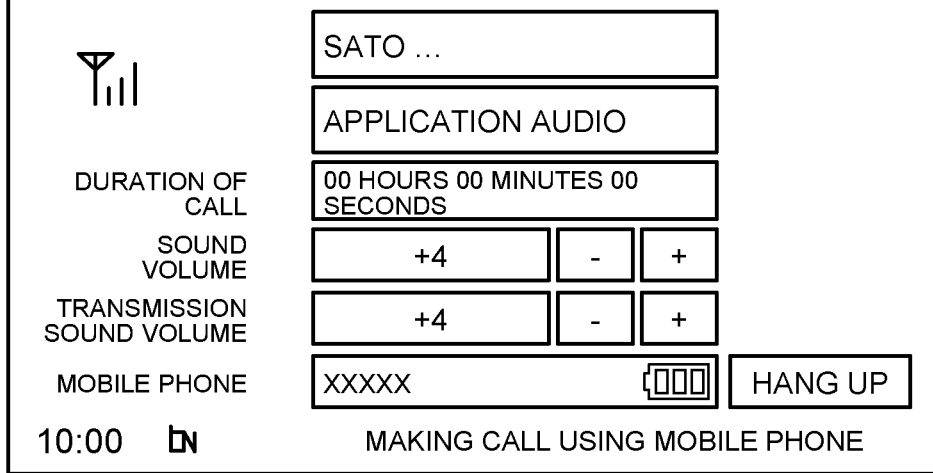
FIG. 22C is a diagram illustrating the transition of a display screen when an outgoing call operation is performed from second history.

FIG. 22B is an example of a display screen displayed on the mobile phone 2 when the mobile phone 2 performs outgoing call processing based on the second communication using the communication application 8B according to the process of S166. During the outgoing call processing using the second communication by the mobile phone 2, for example, an in-outgoing call display screen for the communication application 8B of the mobile phone 2 illustrated in FIG. 22B is displayed on the mobile phone 2.

On the other hand, during the outgoing call processing based on the second communication, the control unit 102 displays an in-outgoing call display screen for the in-vehicle hands-free apparatus 1 on the display unit 15 (S167). For example, the control unit 102 displays an in-outgoing call display screen for the in-vehicle hands-free apparatus 1 illustrated in FIG. 22C on the display unit 15.

The description will be continued on the assumption that an incoming call is accepted by the mobile phone 2 of an outgoing call destination on the basis of the outgoing call processing of the control unit 102. By so doing, the in-vehicle hands-free apparatus 1 starts a voice call based on the second communication using the communication application 8B of the mobile phone 2 (S168).

Figure 22D:
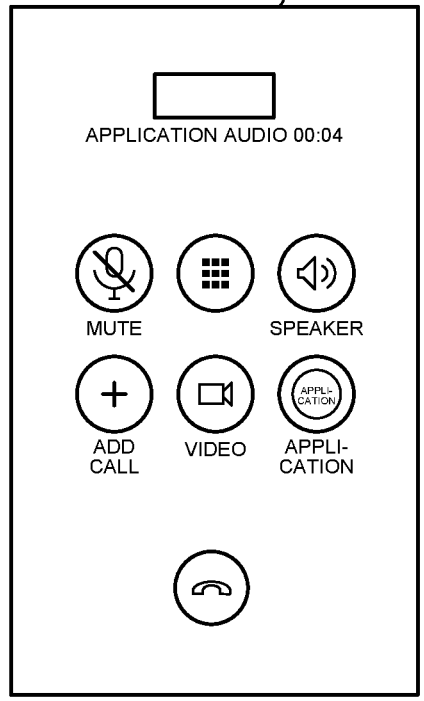
FIG. 22D is a diagram illustrating the transition of a display screen when an outgoing call operation is performed from second history.
Figure 22E:
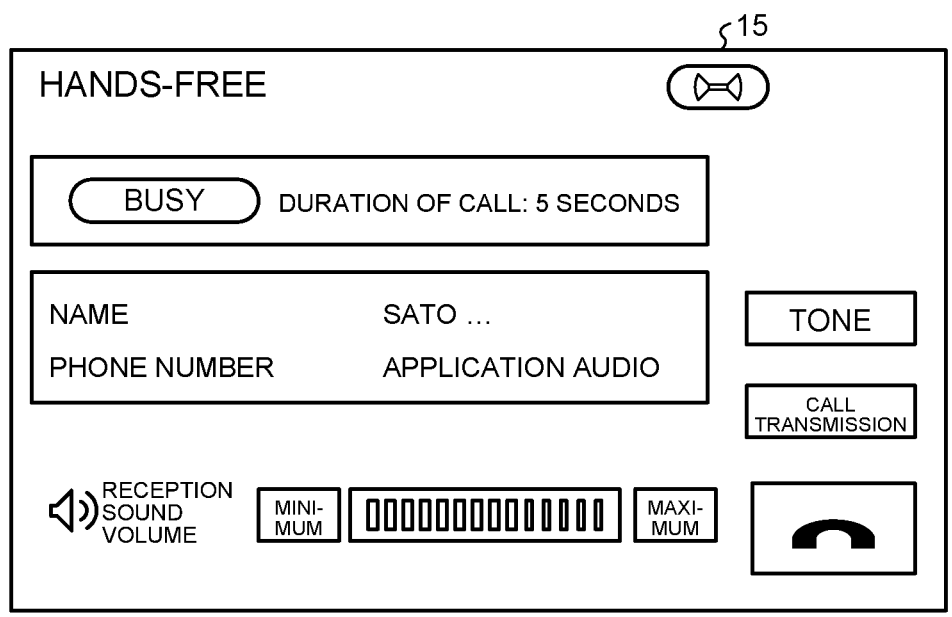
FIG. 22E is a diagram illustrating the transition of a display screen when an outgoing call operation is performed from second history.

During the voice call based on the second communication, an in-call display screen for the communication application 8B of the mobile phone 2 is displayed on the display unit 4 of the mobile phone 2. For example, an in-call display screen illustrated in FIG. 22D is displayed on the display unit 4 of the mobile phone 2.

On the other hand, during the voice call based on the second communication, the control unit 102 displays an in-call display screen for the in-vehicle hands-free apparatus 1 on the display unit 15 (S169). For example, during the voice call based on the second communication, the control unit 102 displays an in-call display screen for the in-vehicle hands-free apparatus 1 illustrated in FIG. 22E on the display unit 15.

When the voice call based on the second communication is ended (S170), the control unit 102 performs the same processes as those of S130 and S131. That is, the control unit 102 erases second outgoing call history data with the oldest outgoing call date and time among the second outgoing call history data stored in the working memory 16 at that time, and additionally stores the latest second outgoing call history data in the working memory 16. Then, the control unit 102 stores, as a time stamp, the date and time acquired by the GPS device of the in-vehicle hands-free apparatus 1 as an outgoing call date and time.

When a negative determination is made at S160 (No at S160), the control unit 102 proceeds to S171. At S171, the control unit 102 determines whether an outgoing call operation based on the registration data is received from the user (S171).

For example, the control unit 102 displays the display screen illustrated in FIG. 21A on the display unit 15. It is assumed that the "contact" 4d button is pressed by an operation instruction of the operating unit 14 from the user and a registration data button is further operated. In this case, the control unit 102 determines that the outgoing call operation based on the registration data has been received (Yes at S171) and proceeds to S172. When a negative determination is made at S171 (No at S171), the control unit 102 returns back to S124 above.

Figure 23A:
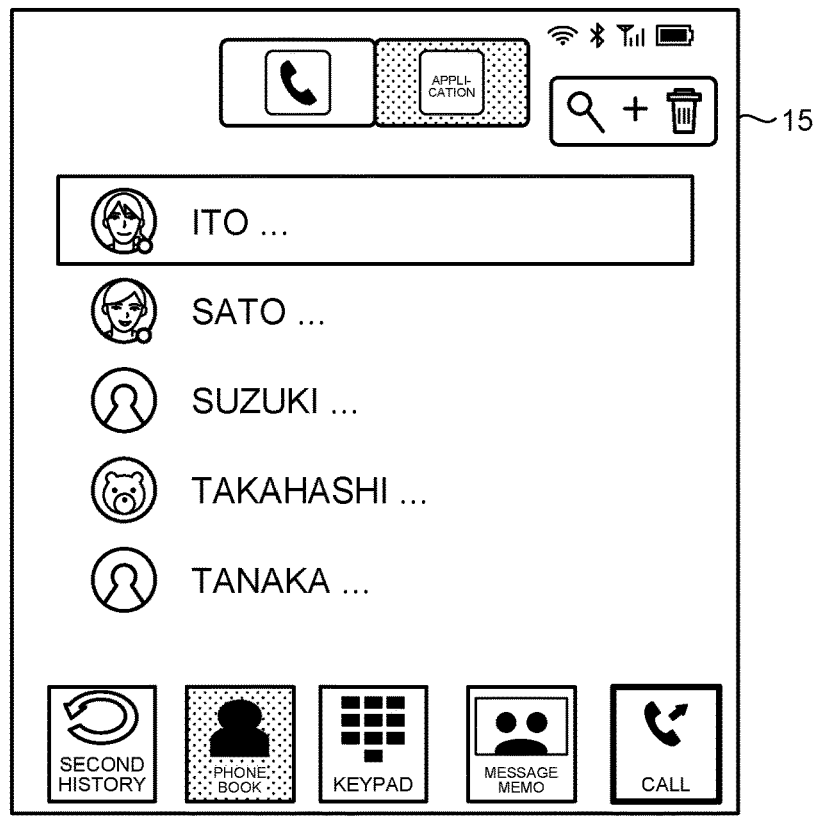
FIG. 23A is a diagram illustrating the transition of a display screen when an outgoing call operation is performed from registration data.

At S172, the control unit 102 refers to the registration data (S172). Then, the display control unit 102 displays an outgoing call operation screen based on the registration data on the display unit 15 (S173). FIG. 23A is a diagram illustrating an example of the outgoing call operation screen based on the registration data. The control unit 102 displays, for example, an outgoing call operation screen illustrated in FIG. 23A on the display unit 15.

The user selects registration data to be sent out from the displayed registration data via the outgoing call operation screen displayed on the display unit 15, and operates the "call" button. The control unit 102 receives the selection of the outgoing call target according to the user's operation instruction (S174), and further receives the selection of the "call" button (S175). FIG. 23A illustrates, as an example, a state in which a registered name "Ito . . . " is selected as an outgoing call target.

The control unit 102 starts the communication application 8B of the mobile phone 2, and performs outgoing call processing of making a call to a voice call destination of the selected registration data by the second communication (S176).

For example, the control unit 102 transmits, to the mobile phone 2, an instruction to start the communication application 8B and a signal indicating the selected voice call destination (account information). The mobile phone 2 starts the communication application 8B in response to the received startup instruction. Then, the mobile phone 2 performs the outgoing call processing of making a call to the voice call destination received from the in-vehicle hands-free apparatus 1, by the second communication using the communication application 8B.

That is, when a voice call destination included in the registration data is selected as an outgoing call target via the outgoing call operation screen of the registration data, the control unit 102 sets the selected outgoing call target as a voice call destination and performs outgoing call processing of making a call by the second communication via the mobile phone 2.

Figure 23B:
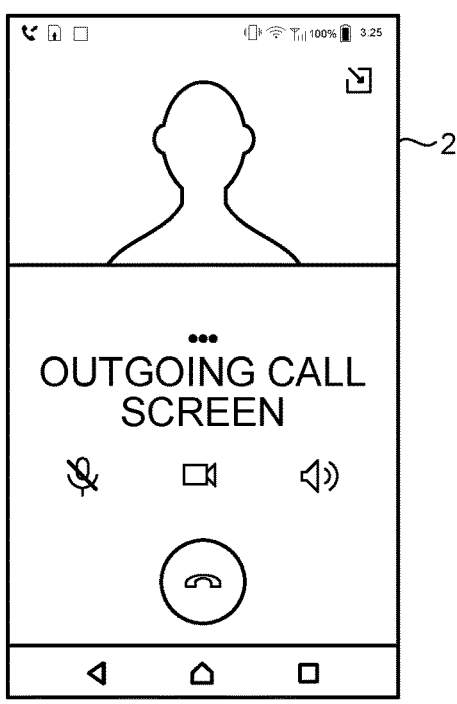
FIG. 23B is a diagram illustrating the transition of a display screen when an outgoing call operation is performed from registration data.
Figure 23C:
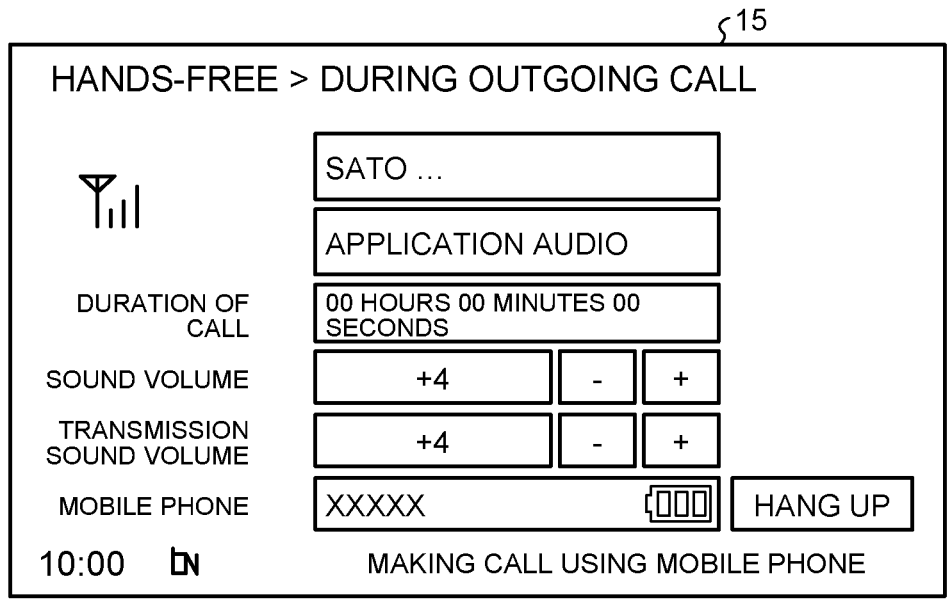
FIG. 23C is a diagram illustrating the transition of a display screen when an outgoing call operation is performed from registration data.

FIG. 23B is an example of a display screen displayed on the mobile phone 2 when the mobile phone 2 performs outgoing call processing based on the second communication using the communication application 8B according to the process of S176. During the outgoing call processing using the second communication by the mobile phone 2, for example, an in-outgoing call display screen for the mobile phone 2 illustrated in FIG. 23B is displayed on the mobile phone 2.

On the other hand, during the outgoing call processing based on the second communication, the control unit 102 displays an in-outgoing call display screen for the in-vehicle hands-free apparatus 1 on the display unit 15 (S177). For example, the control unit 102 displays an in-outgoing call display screen for the in-vehicle hands-free apparatus 1 illustrated in FIG. 23C on the display unit 15.

The description will be continued on the assumption that an incoming call is accepted by the mobile phone 2 of an outgoing call destination on the basis of the outgoing call processing of the control unit 102. By so doing, the in-vehicle hands-free apparatus 1 starts a voice call based on the second communication using the communication application 8B of the mobile phone 2 (S178).

Figure 23D:
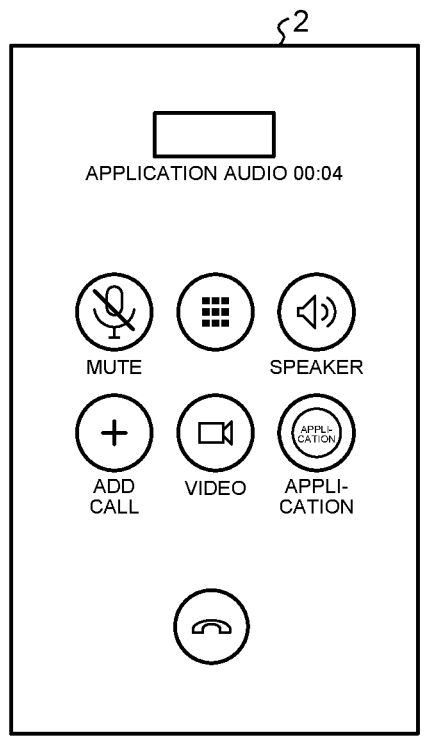
FIG. 23D is a diagram illustrating the transition of a display screen when an outgoing call operation is performed from registration data.
Figure 23E:
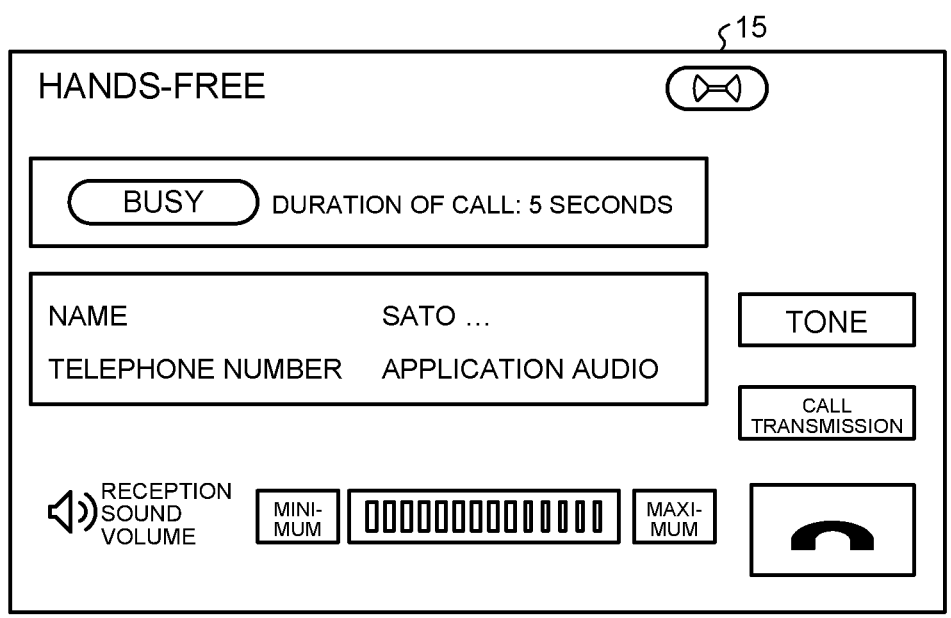
FIG. 23E is a diagram illustrating the transition of a display screen when an outgoing call operation is performed from registration data.

During the voice call based on the second communication, an in-call display screen for the communication application 8B of the mobile phone 2 is displayed on the display unit 4 of the mobile phone 2. For example, an in-call display screen illustrated in FIG. 23D is displayed on the display unit 4 of the mobile phone 2.

On the other hand, during the voice call based on the second communication, the control unit 102 displays an in-call display screen for the in-vehicle hands-free apparatus 1 on the display unit 15 (S179). For example, during the voice call based on the second communication, the control unit 102 displays an in-call display screen for the in-vehicle hands-free apparatus 1 illustrated in FIG. 23E on the display unit 15.

When the voice call based on the second communication is ended (S180), the control unit 102 performs the same processes as those of S130 and S131. That is, the control unit 102 erases second outgoing call history data with the oldest outgoing call date and time among the second outgoing call history data stored in the working memory 16 at that time, and additionally stores the latest second outgoing call history data in the working memory 16. Then, the control unit 102 stores, as a time stamp, the date and time acquired by the GPS device of the in-vehicle hands-free apparatus 1 as an outgoing call date and time.

As described with reference to FIG. 14 to FIG. 16, the control unit 102 of the in-vehicle hands-free apparatus 1 of the present embodiment performs outgoing call processing based on the first communication using the phone application 8A when an outgoing call operation is made via an outgoing call operation screen for allowing an outgoing call operation using the first history data or the phone book data. Furthermore, the control unit 102 of the in-vehicle hands-free apparatus 1 of the present embodiment performs outgoing call processing based on the second communication using the communication application 8B when an outgoing call operation is made via an outgoing call operation screen for allowing an outgoing call operation using the second history data or the registration data.

Therefore, the in-vehicle hands-free apparatus 1 of the present embodiment can implement hands-free calls via a plurality of types of applications used for voice communication.

Instead of an outgoing call operation screen for allowing an outgoing call operation using the second history data, the control unit 102 may use an outgoing call operation screen for allowing an outgoing call operation for each of the second incoming call history data and the second outgoing call history data included in the second history data.

The control unit 102 may display a display screen displayed on the mobile phone 2, on the display unit 15 of the in-vehicle hands-free apparatus 1 during the period from an outgoing call to a call destination corresponding to an incoming call source included in the second incoming call history data or an outgoing call destination included in the second outgoing call history data, to the end of the outgoing call, the incoming call source and the outgoing call destination being selected via the outgoing call operation screen.

Specifically, during the outgoing call processing based on the second communication at S167 above, the control unit 102 may display an in-outgoing call display screen for the communication application 8B of the mobile phone 2 instead of an in-outgoing call display screen for the in-vehicle hands-free apparatus 1. For example, the control unit 102 may display, on the display unit 15, an in-outgoing call display screen for the communication application 8B of the mobile phone 2 illustrated in FIG. 24A instead of the outgoing call display screen for the in-vehicle hands-free apparatus 1 illustrated in FIG. 22C. In this case, the control unit 102 may display, on the display unit 15, the in-outgoing call display screen for the communication application 8B of the mobile phone 2 by a screen capture process of capturing, as image data, the in-outgoing call display screen (see FIG. 22B) displayed on the mobile phone 2.

Similarly, the control unit 102 may display the in-call display screen for the communication application 8B of the mobile phone 2 instead of the in-call display screen for the in-vehicle hands-free apparatus 1 at S169 above. For example, the control unit 102 performs a screen capture process of capturing, as image data, the in-call display screen (see FIG. 22D and FIG. 24B) for the communication application 8B displayed on the display unit 4 of the mobile phone 2, instead of the in-call display screen of the in-vehicle hands-free apparatus 1 illustrated in FIG. 22E. With this screen capture process, the control unit 102 may display, for example, an in-call display screen for the communication application 8B of the mobile phone 2 illustrated in FIG. 24C on the display unit 15 of the in-vehicle hands-free apparatus 1.

Similarly, during the outgoing call processing based on the second communication at S177 above, the control unit 102 may display the in-outgoing call display screen for the communication application 8B of the mobile phone 2 instead of the in-outgoing call display screen for the in-vehicle hands-free apparatus 1. For example, the control unit 102 may display, on the display unit 15, the in-outgoing call display screen (see FIG. 23B) for the communication application 8B of the mobile phone 2 instead of the in-outgoing call display screen for the in-vehicle hands-free apparatus 1 illustrated in FIG. 23C. In this case, the control unit 102 may display, on the display unit 15 of the in-vehicle hands-free apparatus 1, an in-outgoing call display screen for the communication application 8B of the mobile phone 2 illustrated in FIG. 25A by a screen capture process of capturing, as image data, the in-outgoing call display screen (see FIG. 23B) displayed on the mobile phone 2.

Similarly, the control unit 102 may display the in-call display screen for the communication application 8B of the mobile phone 2 instead of the in-call display screen for the in-vehicle hands-free apparatus 1 at S179 above. For example, the control unit 102 performs a screen capture process of capturing, as image data, the in-call display screen (see FIG. 23D and FIG. 25B) for the communication application 8B displayed on the display unit 4 of the mobile phone 2, instead of the in-call display screen of the in-vehicle hands-free apparatus 1 illustrated in FIG. 23E. With this screen capture process, the control unit 102 may display, for example, an in-call display screen for the communication application 8B of the mobile phone 2 illustrated in FIG. 25C on the display unit 15 of the in-vehicle hands-free apparatus 1.

In the flowchart illustrated in FIG. 16, a mode in which the outgoing call operation screen based on the second history of the second history data is displayed on the display unit 15 has been described. However, the control unit 102 may display separate outgoing call operation screens on the display unit 15 with respect to the second incoming call history of the second incoming call history data and the second outgoing call history of the second outgoing call history data.

Furthermore, in the flowcharts illustrated in FIG. 14 to FIG. 16, a mode in which the first history data and the second history data are displayed on separate display screens is shown as an example. However, the control unit 102 may display the first history data and the second history data on the display unit 15 as one display screen.

Figure 26:
FIG. 26 is a schematic diagram of a display screen.

FIG. 26 is a schematic diagram illustrating an example of a display screen displayed on the display unit 15 by the control unit 102. As illustrated in FIG. 26, the control unit 102 may display, on the display unit 15, an outgoing call operation screen for allowing an outgoing call operation to an incoming call source and an outgoing call destination represented by the first history data and the second history data. In this case, when an outgoing call target selected via the outgoing call operation screen is an outgoing call target registered in the first history data or the phone book data, the control unit 102 may perform outgoing call processing based on the first communication. Furthermore, when the outgoing call target selected via the outgoing call operation screen is an outgoing call target registered in the second history data or the registration data, the control unit 102 may perform outgoing call processing based on the second communication.

Figure 27:
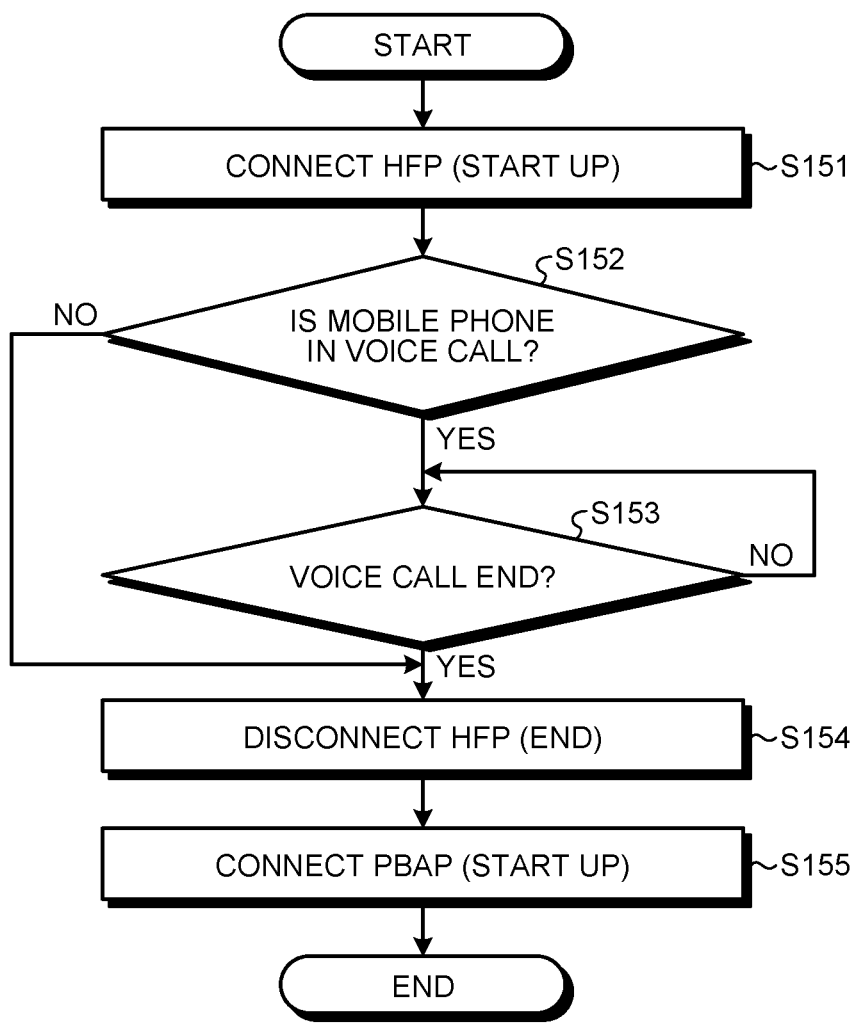
FIG. 27 is a flowchart illustrating details of a flow of an HFP connection process.

Next, the HFP connection process at S2 in the flowchart of FIG. 5 described above will be described in detail. FIG. 27 is a flowchart illustrating details of the flow of the HFP connection process according to the present embodiment.

When it is determined that a channel has been established with the mobile phone 2 existing in the Bluetooth communication range, the hands-free call connection control unit 111 makes an HFP-wireless communication connection (S151) and determines whether the mobile phone 2 is in a voice call (S152). Whether the mobile phone 2 is in a voice call or in standby is notified by the HFP-wireless communication, is received by the in-vehicle hands-free apparatus 1, and is determined based on the received communication state. S151 corresponds to the process of S2 in FIG. 5.

When it is determined that the mobile phone 2 is not in a voice call, that is, in standby for receiving an incoming call (No at S152), the hands-free call connection control unit 111 disconnects the connected HFP-wireless communication (S154). Then, the data transfer control unit 112 connects PBAP-based wireless communication (S155). That is, when the mobile phone 2 is not in a voice call, the hands-free call connection control unit 111 quickly and automatically disconnects the connected HFP-wireless communication and automatically connects the PBAP-based wireless communication. By these processes, the control unit 102 causes the Bluetooth communication unit 13 to receive the first history data, the second history data, the phone book data, and the registration data transmitted from the mobile phone 2.

Furthermore, when it is determined that the mobile phone 2 is in a voice call (Yes at S152), the hands-free call connection control unit 111 considers that the voice call may be processed as a hands-free voice call by the in-vehicle hands-free apparatus 1, and maintains the HFP-wireless communication. Whether to process this voice call basically depends on the mobile phone 2. When the mobile phone 2 makes an HFP-wireless communication connection during a voice call, received voice may be automatically transmitted to the Bluetooth communication unit 13 or may be transmitted to the Bluetooth communication unit 13 by an operation on the mobile phone 2.

The hands-free call connection control unit 111 determines whether the mobile phone 2 has ended the voice call (S153). When it is determined that the mobile phone 2 has ended the voice call (Yes at S153), the hands-free call connection control unit 111 disconnects the connected HFP-wireless communication (No at S154), and the data transfer control unit 112 connects PBAP-based wireless communication (S155). That is, when the mobile phone 2 is in a voice call, the hands-free call connection control unit 111 disconnects the connected HFP-wireless communication after the voice call is ended, and connects the PBAP-based wireless communication. By these processes, the control unit 102 causes the Bluetooth communication unit 13 to receive outgoing call history data, incoming call history data, and phone book data transmitted from the mobile phone 2 after the user has ended a hands-free voice call. S152 and S153 correspond to the process between S3 and S4 in FIG. 5.

When the mobile phone 2 is connected to the in-vehicle hands-free apparatus 1 in this way, the in-vehicle hands-free apparatus 1 determines whether the mobile phone 2 is in a voice call. When the mobile phone 2 is in a voice call, switching to the PBAP-based wireless communication may not allow a hands-free voice call. Therefore, the in-vehicle hands-free apparatus 1 maintains the HFP-wireless communication and makes no PBAP-based wireless communication connection during a voice call. When it is determined that the voice call has ended, the in-vehicle hands-free apparatus 1 disconnects the HFP-wireless communication and makes a PBAP-based wireless communication connection. As a consequence, when the mobile phone 2 is making a voice call alone, it can be smoothly switched to a hands-free voice call.

Furthermore, the control unit 102 may be configured to distinguishably receive incoming call history answered as the first incoming call history data or the second incoming call history data and missed call history, which is an unanswered incoming call, from the mobile phone 2, and store the received incoming call history and missed call history.

Figure 28A:
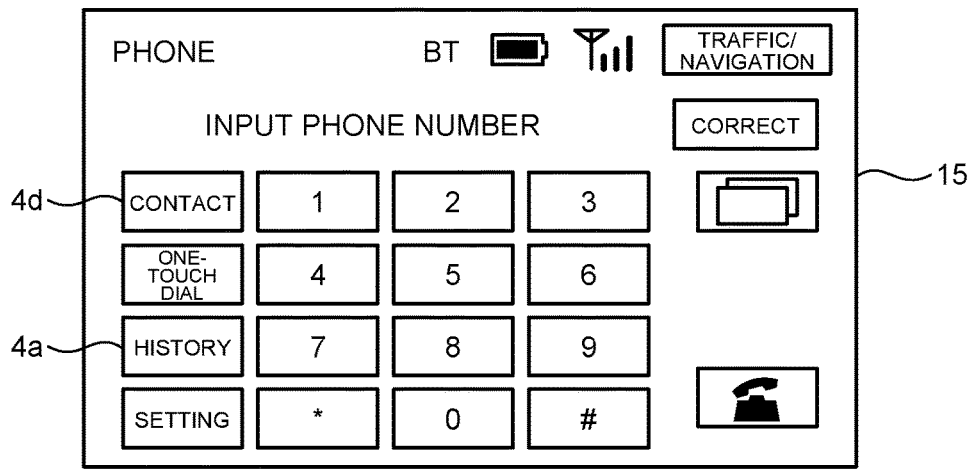
FIG. 28A is a diagram illustrating the transition of a display screen when a user performs an outgoing call operation from first incoming call history.
Figure 28B:
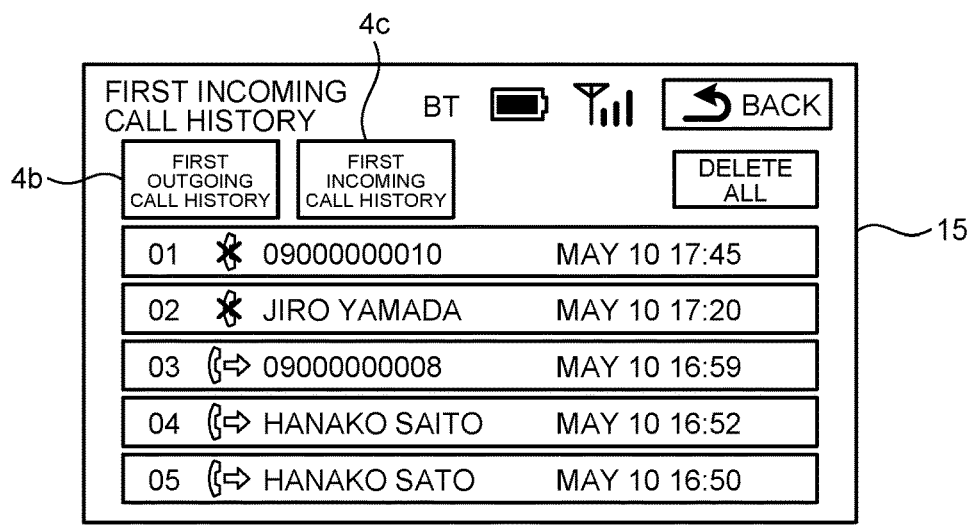
FIG. 28B is a diagram illustrating the transition of a display screen when a user performs an outgoing call operation from first incoming call history.
Figure 28C:
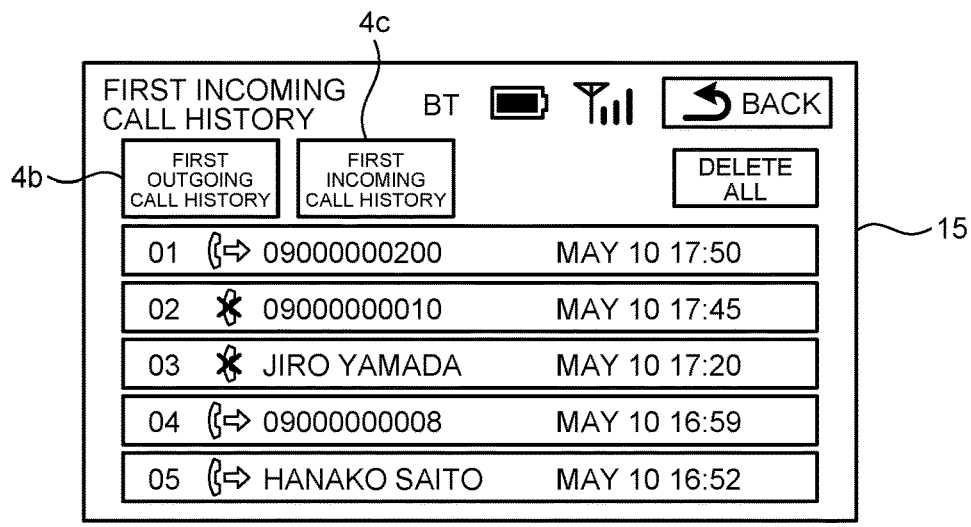
FIG. 28C is a diagram illustrating the transition of a display screen when a user performs an outgoing call operation from first incoming call history.

FIG. 28A to FIG. 28C are diagrams illustrating another example of the transition of a display screen when the user performs an outgoing call operation from the first incoming call history. It is assumed that the user presses the "history" button 4a and then presses the "incoming call history" button 4c, which results in an outgoing call operation based on the first incoming call history. In this case, the control unit 102 refers to the first incoming call history data stored in the working memory 16, refers to the phone book data stored in the working memory 16, and displays an outgoing call operation screen based on the first incoming call history on the display unit 15 as illustrated in FIG. 28B and FIG. 28C. Furthermore, the control unit 102 displays one of the following icon figures for each data: an icon figure indicating an answered incoming call (figure including a combination of a handset and an arrow) and an icon figure indicating a missed call (figure including a combination of a handset and an X).

The control unit 102 may perform the same process on the second incoming call history.

In the present embodiment, a case where the first history data, the second history data, the phone book data, and the registration data transferred from the mobile phone 2 are stored in the working memory 16 and the storage memory 17 has been described. However, the first history data, the second history data, the phone book data, and the registration data transferred from the mobile phone 2 may also be configured to be stored in the storage memory 17. In this case, even when the in-vehicle hands-free apparatus 1 is powered off, the first history data, the second history data, the phone book data, and the registration data stored in the storage memory 17 is retained.

As described above, the in-vehicle hands-free apparatus 1 of the present embodiment is wirelessly connected to the mobile phone 2 to enable hands-free calls. The mobile phone 2 stores the first incoming call history data, the first outgoing call history data, the phone book data, the second incoming call history data, the second outgoing call history data, and the registration data. The first incoming call history data represents the source of an incoming call received by the first communication of voice using the phone application 8A dedicated to an OS of the mobile phone 2. The first outgoing call history data represents the destination of an outgoing call made by the first communication. The phone book data is registered by associating registered names with a call destination corresponding to the source of an incoming call received by the first communication and the destination of an outgoing call made by the first communication. The second incoming call history data represents the source of an incoming call received by the second communication of voice using the communication application 8B. The second outgoing call history data represents the destination of an outgoing call made by the second communication. The registration data is registered by associating registered names with a call destination corresponding to the source of an incoming call received by the second communication and the destination of an outgoing call made by the second communication.

The in-vehicle hands-free apparatus 1 includes the control unit 102, the data reception unit 103, and the storage unit 104. When the mobile phone 2 exists in a wireless connection area, the control unit 102 performs control relating data transfer using a transfer protocol to achieve transfer of the first incoming call history data, the first outgoing call history data, the phone book data, the second incoming call history data, the second outgoing call history data, and the registration data, stored in the mobile phone 2. The data reception unit 103 receives the first incoming call history data, the first outgoing call history data, the phone book data, the second incoming call history data, the second outgoing call history data, and the registration data from the mobile phone 2 by communication using the transfer protocol. The storage unit 104 stores therein the received first incoming call history data, first outgoing call history data, second incoming call history data, phone book data, second incoming call history data, second outgoing call history data, and registration data.

In the related art, cooperation with the in-vehicle hands-free apparatus 1 using each of a plurality of applications used for voice communication and installed in the mobile phone 2 has not been considered. That is, in the related art, it has been desired to further improve the convenience of the in-vehicle hands-free apparatus.

On the other hand, in the in-vehicle hands-free apparatus 1 of the present embodiment, the first incoming call history data, the first outgoing call history data, and the phone book data for the phone application 8A and the second incoming call history data, the second outgoing call history data, and the registration data for the communication application 8B are transferred to and stored in the in-vehicle hands-free apparatus 1 by communication using a transfer protocol, the phone application 8A and the communication application 8B being stored in the mobile phone 2.

Therefore, by using the first incoming call history data, the first outgoing call history data, the phone book data, the second incoming call history data, the second outgoing call history data, and the registration data, the in-vehicle hands-free apparatus 1 of the present embodiment can perform outgoing call processing and incoming call processing using use each of the phone application 8A and the communication application 8B. In other words, the in-vehicle hands-free apparatus 1 can implement hands-free calls using each of the first communication based on the phone application 8A and the second communication based on the communication application 8B.

Consequently, the in-vehicle hands-free apparatus 1 of the present embodiment can improve convenience.

Furthermore, as described with reference to FIG. 14 to FIG. 16, the control unit 102 of the in-vehicle hands-free apparatus 1 of the present embodiment performs outgoing call processing based on the first communication using the phone application 8A when an outgoing call operation is made via an outgoing call operation screen for allowing an outgoing call operation using the first history data or the phone book data. Furthermore, the control unit 102 of the in-vehicle hands-free apparatus 1 of the present embodiment performs outgoing call processing based on the second communication using the communication application 8B when an outgoing call operation is made via an outgoing call operation screen for allowing an outgoing call operation using the second history data or the registration data.

Therefore, the in-vehicle hands-free apparatus 1 of the present embodiment can implement a voice call via a plurality of types of applications used for voice communication. Therefore, the in-vehicle hands-free apparatus 1 of the present embodiment can further improve convenience.

A computer program to be executed by the in-vehicle hands-free apparatus 1 of the present embodiment is provided by being pre-embedded in ROM or the like. The computer program to be executed by the in-vehicle hands-free apparatus 1 of each of the above embodiments may be configured to be provided in an installable or executable format file on a computer-readable recording medium such as CD-ROM, flexible disk (FD), CD-R, digital versatile disc (DVD).

Moreover, the computer program to be executed by the in-vehicle hands-free apparatus 1 of the present embodiment may be configured to be stored on a computer connected to a network such as the Internet, and to be provided by being downloaded via the network. Furthermore, the computer program to be executed by the in-vehicle hands-free apparatus 1 of each of the above embodiments may be configured to be provided or distributed via the network such as the Internet.

Other Embodiments

The present disclosure is not limited only to each of the embodiments described above, but can be modified or extended as follows.

The in-vehicle hands-free apparatus 1 may also be configured as a dedicated in-vehicle hands-free apparatus that primarily implements a hands-free function, or may be a vehicle audio device that plays CD or radio and has a hands-free function. Furthermore, the in-vehicle hands-free apparatus 1 may also be a portable type configuration with portability.

The configuration of the mobile phone 2 and the in-vehicle hands-free apparatus 1 is not limited to Bluetooth communication, but may also be configured to use other short-range wireless communication, or even wired communication.

Furthermore, the in-vehicle hands-free apparatus 1 may be configured to store the first history data, the second history data, the phone book data, and the registration data received from the mobile phone 2 in the storage memory 17, and to update the stored data each time these data are received. Furthermore, the in-vehicle hands-free apparatus 1 may be configured to store the first history data, the second history data, the phone book data, and the registration data received from the mobile phone 2 in both the working memory 16 and the storage memory 17, and to use the storage memory 17 as a backup memory.

The numbers of first history data and second history data storable in the working memory 16 may each be one. In this case, when the in-vehicle hands-free apparatus 1 performs outgoing call processing or incoming call processing, the first history data and the second history data received through the PBAP-based wireless communication connection are necessarily erased.

Furthermore, in the in-vehicle hands-free apparatus 1, a plurality of first outgoing call history data, a plurality of second outgoing call history data, a plurality of first incoming call history data, and a plurality of second incoming call history data are displayed at the same time, but may be displayed one by one. In this case, for example, the latest data may be displayed first, and then the latest data may be displayed in sequence by an operation of the operating unit 14.

Furthermore, the configuration is not limited to the automatic transfer of the first history data, the second history data, the phone book data, and the registration data when a Bluetooth channel is established between the mobile phone 2 and the in-vehicle hands-free apparatus 1, and may be a configuration of transferring these data from the mobile phone 2 to the in-vehicle hands-free apparatus 1 on the condition that the user operates the in-vehicle hands-free apparatus 1 or the mobile phone 2.

Furthermore, when the first history data, the second history data, the phone book data, and the registration data received from the mobile phone 2 are stored in the working memory 16 separately for each mobile phone 2, the configuration is not limited to a configuration of associating the mobile phone 2 to the data stored in the working memory 16 by a method of generating a link key, and may be a configuration of associating the mobile phone 2 to the data by other methods.

According to the present disclosure, an in-vehicle hands-free apparatus, an in-vehicle hands-free apparatus with improved convenience, an in-vehicle hands-free system, and a data transfer method can be provided.

While certain embodiments have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

What is claimed is:

1. An in-vehicle hands-free apparatus that enables a hands-free call by being wirelessly connected to a mobile phone that stores first incoming call history data representing a source of an incoming call received by first communication of voice using a phone application dedicated to an operating system of the mobile phone, first outgoing call history data representing a destination of an outgoing call made by the first communication, and phone book data in which a call destination and a registered name are registered in association with each other, the call destination including the source of the incoming call received by the first communication and the destination of the outgoing call made by the first communication, second incoming call history data representing a source of an incoming call received by second communication of voice using a communication application, second outgoing call history data representing a destination of an outgoing call made by the second communication, and registration data in which a call destination and a registered name are registered in association with each other, the call destination including the source of the incoming call received by the second communication and the destination of the outgoing call made by the second communication, the in-vehicle hands-free apparatus comprising:

a memory; and a hardware processor coupled to the memory, the hardware processor being configured to:

perform control relating to data transfer using a transfer protocol to achieve transfer of the first incoming call history data, the first outgoing call history data, the phone book data, the second incoming call history data, the second outgoing call history data, and the registration data, stored in the mobile phone, when the mobile phone exists in a wireless connection area;

receive the first incoming call history data, the first outgoing call history data, the phone book data, the second incoming call history data, the second outgoing call history data, and the registration data from the mobile phone by communication using the transfer protocol; and store the received first incoming call history data, first outgoing call history data, phone book data, second incoming call history data, second outgoing call history data, and registration data.

2. The in-vehicle hands-free apparatus according to claim 1, wherein the hardware processor is configured to display, on a display, an outgoing call operation screen for allowing an outgoing call operation by a user with respect to at least one of the source of the incoming call represented by the second incoming call history data and the destination of the outgoing call represented by the second outgoing call history data.

3. The in-vehicle hands-free apparatus according to claim 2, wherein the hardware processor is configured to make a call to one selected via the outgoing call operation screen from the source of the incoming call included in the second incoming call history data and the destination of the outgoing call included in the second outgoing call history data by the second communication via the mobile phone.

4. The in-vehicle hands-free apparatus according to claim 3, wherein the hardware processor is configured to display a display screen displayed on the mobile phone, on the display during a period from an outgoing call based on the second communication to one selected via the outgoing call operation screen from the source of the incoming call included in the second incoming call history data and the destination of the outgoing call included in the second outgoing call history data, to an end of the outgoing call.

5. The in-vehicle hands-free apparatus according to claim 1, wherein the hardware processor is configured to cause the first incoming call history data and the first outgoing call history data to be transferred before the phone book data, and cause the second incoming call history data and the second outgoing call history data to be transferred before the registration data.

6. An in-vehicle hands-free system that enables a hands-free call by being wirelessly connected to a mobile phone that stores first incoming call history data representing a source of an incoming call received by first communication of voice using a phone application dedicated to an operating system of the mobile phone, first outgoing call history data representing a destination of an outgoing call made by the first communication, and phone book data in which a call destination and a registered name are registered in association with each other, the call destination including the source of the incoming call received by the first communication and the destination of the outgoing call made by the first communication, second incoming call history data representing a source of an incoming call received by second communication of voice using a communication application, second outgoing call history data representing a destination of an outgoing call made by the second communication, and registration data in which a call destination and a registered name are registered in association with each other, the call destination including the source of the incoming call received by the second communication and the destination of the outgoing call made by the second communication, the in-vehicle hands-free system comprising:
a memory; and
a hardware processor coupled to the memory,
the hardware processor being configured to:
perform control relating to data transfer using a transfer protocol to achieve transfer of the first incoming call history data, the first outgoing call history data, the phone book data, the second incoming call history data, the second outgoing call history data, and the registration data, stored in the mobile phone, when the mobile phone exists in a wireless connection area;

receive the first incoming call history data, the first outgoing call history data, the phone book data, the second incoming call history data, the second outgoing call history data, and the registration data from the mobile phone by communication using the transfer protocol; and store the received first incoming call history data, first outgoing call history data, second incoming call history data, phone book data, second outgoing call history data, and registration data.

7. A data transfer method performed by an in-vehicle hands-free apparatus that enables a hands-free call by being wirelessly connected to a mobile phone that stores first incoming call history data representing a source of an incoming call received by first communication of voice using a phone application dedicated to an operating system of the mobile phone, first outgoing call history data representing a destination of an outgoing call made by the first communication, and phone book data in which a call destination and a registered name are registered in association with each other, the call destination including the source of the incoming call received by the first communication and the destination of the outgoing call made by the first communication, second incoming call history data representing a source of an incoming call received by second communication of voice using a communication application, second outgoing call history data representing a destination of an outgoing call made by the second communication, and registration data in which a call destination and a registered name are registered in association with each other, the call destination including the source of the incoming call received by the second communication and the destination of the outgoing call made by the second communication, the data transfer method comprising:
performing control relating to data transfer using a transfer protocol to achieve transfer of the first incoming call history data, the first outgoing call history data, the phone book data, the second incoming call history data, the second outgoing call history data, and the registration data, stored in the mobile phone, when the mobile phone exists in a wireless connection area;

receiving the first incoming call history data, the first outgoing call history data, the phone book data, the second incoming call history data, the second outgoing call history data, and the registration data from the mobile phone by communication using the transfer protocol; and storing the received first incoming call history data, first outgoing call history data, phone book data, second incoming call history data, second outgoing call history data, and registration data.

* * * * *